US012658511B2

(12) United States Patent
Kim et al.

(10) Patent No.: US 12,658,511 B2
(45) Date of Patent: Jun. 16, 2026

(54) ALL SOLID SECONDARY BATTERY, ALL SOLID SECONDARY BATTERY STRUCTURE AND PREPARATION METHOD FOR ALL SOLID SECONDARY BATTERY

(71) Applicant: SAMSUNG SDI CO., LTD., Yongin-si (KR)

(72) Inventors: Jeonghoon Kim, Yongin-si (KR); Jongdae Kim, Yongin-si (KR); Mansoo Shin, Yongin-si (KR); Ikhwan Cho, Yongin-si (KR); Youngseok Jeong, Yongin-si (KR); Daesik Oh, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 206 days.

(21) Appl. No.: 18/013,932

(22) PCT Filed: Jul. 20, 2022

(86) PCT No.: PCT/KR2022/010641
§ 371 (c)(1),
(2) Date: Feb. 2, 2023

(87) PCT Pub. No.: WO2023/008821
PCT Pub. Date: Feb. 2, 2023

(65) Prior Publication Data
US 2024/0222748 A1 Jul. 4, 2024

(30) Foreign Application Priority Data

Jul. 30, 2021 (KR) ........................ 10-2021-0101015
May 6, 2022 (KR) ........................ 10-2022-0056244

(51) Int. Cl.
*H01M 50/124* (2021.01)
*H01M 4/04* (2006.01)
(Continued)

(52) U.S. Cl.
CPC ....... *H01M 50/124* (2021.01); *H01M 4/0404* (2013.01); *H01M 4/364* (2013.01);
(Continued)

(58) Field of Classification Search
CPC ............. H01M 50/121; H01M 50/124; H01M 50/133; H01M 50/119; H01M 50/204;
(Continued)

(56) References Cited

U.S. PATENT DOCUMENTS 6,296,971 B1 10/2001 Hara
2014/0082931 A1* 3/2014 Nishino ............ H01M 10/0562
29/623.4
(Continued)

FOREIGN PATENT DOCUMENTS

JP 2004-199994 A 7/2004
JP 2013-048042 A 3/2013
(Continued)

OTHER PUBLICATIONS

JP2021027044 translation (Year: 2021).*
International Search Report dated Oct. 28, 2022.
Korean Office action dated Nov. 25, 2025.

*Primary Examiner* — Jane J Rhee
(74) *Attorney, Agent, or Firm* — Lee IP Law, P.C.

(57) ABSTRACT

An all solid secondary battery includes: a stack including positive and negative electrode layers, and a solid electrolyte layer between the electrode layers, the positive electrode layer includes a positive electrode current collector and a positive electrode active material layer thereon, the negative electrode layer includes a negative electrode current collector and a first negative electrode active material layer thereon, and the first negative electrode active material layer does not contain a solid electrolyte or an amount of the solid electrolyte contained in the first negative electrode active material layer is 3 wt % or less; and an exterior casing (Continued)

1 material for accommodating and sealing the stack, the exterior casing material includes a first exterior casing material on a first surface of the stack, and a second exterior casing material on the second surface of the stack, and the first exterior casing material includes a cushioning layer.

19 Claims, 10 Drawing Sheets

(51) Int. Cl.

| | |
|---|---|
| *H01M 4/36* | (2006.01) |
| *H01M 4/40* | (2006.01) |
| *H01M 4/583* | (2010.01) |
| *H01M 10/0562* | (2010.01) |
| *H01M 50/119* | (2021.01) |
| *H01M 50/121* | (2021.01) |
| *H01M 50/133* | (2021.01) |
| *H01M 50/136* | (2021.01) |
| *H01M 50/204* | (2021.01) |
| *H01M 4/02* | (2006.01) |

(52) U.S. Cl.
CPC ........... *H01M 4/366* (2013.01); *H01M 4/405* (2013.01); *H01M 4/583* (2013.01); *H01M 10/0562* (2013.01); *H01M 50/119* (2021.01); *H01M 50/121* (2021.01); *H01M 50/133* (2021.01); *H01M 50/136* (2021.01); *H01M 50/204* (2021.01); *H01M 2004/021* (2013.01); *H01M 2004/027* (2013.01); *H01M 2300/0068* (2013.01)

(58) Field of Classification Search
CPC .... H01M 4/0404; H01M 4/364; H01M 4/366; H01M 4/405; H01M 4/583; H01M 10/0562; H01M 2004/021; H01M 2004/027; H01M 2300/0068
See application file for complete search history.

(56) References Cited

U.S. PATENT DOCUMENTS

| | | | |
|---|---|---|---|
| 2016/0156021 A1 | 6/2016 | Aihara et al. | |
| 2019/0089009 A1* | 3/2019 | Yoshima | ............. H01M 50/209 |
| 2020/0212376 A1* | 7/2020 | Mochizuki | .......... H01M 10/049 |
| 2020/0350613 A1* | 11/2020 | Kato | ................. H01M 10/0562 |
| 2021/0143412 A1* | 5/2021 | Lee | ....................... H01M 4/623 |
| 2021/0384550 A1* | 12/2021 | Kumagae | .......... H01M 10/0436 |

FOREIGN PATENT DOCUMENTS

| | | | |
|---|---|---|---|
| JP | 6551220 | B2 | 6/2017 |
| JP | 2020-155244 | A | 9/2020 |
| JP | 6860681 | B2 | 3/2021 |
| KR | 10-0619652 | B1 | 8/2006 |
| KR | 10-2016-0064942 | A | 6/2016 |
| KR | 10-2261182 | B1 | 1/2019 |
| KR | 10-2021-0057270 | A | 5/2021 |
| WO | WO2019/189007 | | 10/2019 |

* cited by examiner

ALL SOLID SECONDARY BATTERY, ALL SOLID SECONDARY BATTERY STRUCTURE AND PREPARATION METHOD FOR ALL SOLID SECONDARY BATTERY

CROSS REFERENCE TO RELATED APPLICATIONS

This is the U.S. national phase application of PCT/KR2022/010641, filed Jul. 20, 2022, which is based on Korean Patent Application No. 10-2021-0101015, filed on Jul. 30, 2021, and Korean Patent Application No. 10-2022-0056244, filed on May 6, 2022, the entire contents of all of which are hereby incorporated by reference.

TECHNICAL FIELD

The present disclosure relates to all solid secondary batteries, all solid secondary battery structures, and methods of manufacturing all solid secondary battery.

BACKGROUND ART

Recently, in response to the industrial demands, batteries having high energy density and safety are being developed. For example, lithium ion batteries are used not only in the fields of information-related devices and communication devices, but also in the automotive field. The automotive field is associated with life, so that safety is an important issue. Commercially available lithium ion batteries include an electrolyte solution containing a flammable organic solvent. Accordingly, when a short circuit occurs, overheating and fire of lithium ion batteries is highly likelihood to occur. In this regard, an all solid secondary battery using a solid electrolyte instead of an electrolyte is proposed.

All solid secondary batteries do not contain flammable organic solvents. Even in the event of a short circuit, the probability of fire or explosion of all solid secondary batteries is low. All solid secondary batteries have increased safety compared to lithium ion batteries that use electrolytes.

In order to further improve the performance of all solid secondary batteries, various manufacturing processes and members are used, and accordingly, the manufacturing processes and structures of all solid secondary batteries become complex and manufacturing costs therefor are increased.

DETAILED DESCRIPTION OF THE DISCLOSURE

Technical Problem

One aspect is to provide an all solid secondary battery with a novel structure.

Another aspect is to provide an all solid secondary battery structure with a novel structure.

Another aspect is to provide a method of manufacturing an all solid secondary battery with a novel structure.

Technical Solution to Problem

According to one embodiment, provided is an all solid secondary battery including: a stack which includes a positive electrode layer, a negative electrode layer, and a solid electrolyte layer disposed between the positive electrode layer and the negative electrode layer, wherein the positive electrode layer includes a positive electrode current collector and a positive electrode active material layer disposed on one surface or opposite surfaces of the positive electrode current collector, the negative electrode layer includes a negative electrode current collector and a first negative electrode active material layer disposed on the negative electrode current collector, and the first negative electrode active material layer does not contain a solid electrolyte or an amount of the solid electrolyte contained in the first negative electrode active material layer is 3 wt % or less of the total weight of the first negative electrode active material layer; and an exterior casing material for accommodating and sealing the stack, wherein the exterior casing material includes a first exterior casing material disposed on a first surface of the stack adjacent to the negative electrode layer, and a second exterior casing material disposed on the second surface of the stack opposing the first surface, and the first exterior casing material includes a cushioning layer.

According to another embodiment, provided is an all solid secondary battery structure including an all solid secondary battery stack including a plurality of all solid secondary batteries stacked in one direction, each of the all solid secondary batteries is the all solid secondary battery described above, and an end plate disposed on one surface or opposite surfaces of the stack.

According to another embodiment, provided is a method of manufacturing an all solid secondary battery including providing an assembly; and preparing a sealed assembly by pressing and sealing the assembly, wherein the assembly includes: a stack including a positive electrode layer, a negative electrode layer, and a solid electrolyte layer disposed between the positive electrode layer and the negative electrode layer; and an exterior casing material for accommodating and sealing the stack, wherein the exterior casing material includes a first exterior casing material disposed on a first surface of the stack adjacent to the negative electrode layer, and a second exterior casing material disposed on the second surface of the stack adjacent to the positive electrode layer, and the positive electrode layer includes a positive electrode current collector and a positive electrode active material layer disposed on one surface or opposite surfaces of the positive electrode current collector, the negative electrode layer includes a negative electrode current collector and a first negative electrode active material layer disposed on the negative electrode current collector, the first negative electrode active material layer does not contain a solid electrolyte or an amount of the solid electrolyte contained in the first negative electrode active material layer is 3 wt % or less of the total weight of the first negative electrode active material layer, and the first exterior casing material includes a cushioning layer.

Advantageous Effects of Disclosure

According to one aspect, an all solid secondary battery with a new structure includes a first exterior casing material including a cushioning layer. Accordingly, an all solid secondary battery in which the occurrence of a short circuit is prevented and of which cycle characteristics are improved, can be provided.

According to another aspect, the structure of the all solid secondary battery structure of the new structure is simplified, and the all solid secondary battery structure can be manufactured in a dry room under relaxed conditions or in a general room other than a dry room.

According to a method of manufacturing an all solid secondary battery according to an aspect, an all solid secondary battery can be manufactured by pressing and sealing the assembly and additional steps and members are omitted. Accordingly, the production efficiency of the all solid secondary battery can be increased.

BEST MODE

Figure 1:
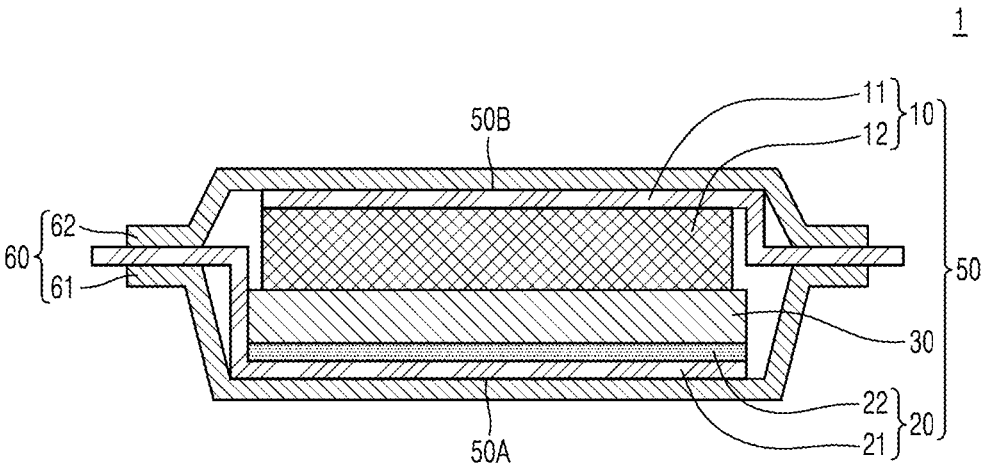
FIG. 1 is a cross-sectional view of a monocell all solid secondary battery according to an embodiment.

An all solid secondary battery containing a solid electrolyte is manufactured by preparing unit cells and pressing the prepared unit cells. For example, a unit cell, in which positive electrode/solid electrolyte/negative electrode are stacked, is prepared. The solid electrolyte is densified by pressing the prepared unit cell. In addition, by pressing the prepared unit cell, interfacial resistance at the interface of the solid electrolyte and the electrode plate is reduced, that is, increased electronic and ionic conductivities may be obtained. In the case where all solid secondary batteries containing sulfide-based solid electrolytes, the solid electrolyte may be sintered through, for example, a high-pressure pressing process of 100 MPa or higher. In regard to the pressing process, an isostatic pressing (IP) method, in which unit cells are put into IP equipment and then pressed, may be used. During IP, the unit cells need to be protected from an IP medium such as water or gas. Accordingly, the unit cells are sealed with a disposable pouch and then pressed, and the disposable pouch is removed after IP. Due to the sealing and removal of the disposable pouch, the entire solid secondary battery manufacturing process is complicated, the productivity is lowered, unit cells are damaged, and the consumption of the disposable pouch results in an increase in material costs.

In the process of manufacturing an all solid secondary battery stack of required capacity by removing the pouch after the pressing process and stacking the unit cells, a cushioning sheet is disposed between the unit cells to absorb the change in volume of unit cells during charging and discharging. By additionally applying the cushioning sheet, the volume of the all solid secondary battery stack is increased, the energy density of the all solid secondary battery stack is decreased, and the production rate of the all solid secondary battery stack is decreased. In addition, since the manufacturing of all solid secondary battery stacks must be carried out in an ultra-low humidity dry room, additional investment is required for these dry room facilities.

The all solid secondary battery according to an aspect has a new structure. Accordingly, a short circuit during charging and discharging may be prevented, cycle characteristics are improved, the process for manufacturing all solid secondary batteries is simplified, and the use of additional members is omitted. Thus, overall manufacturing efficiency may be improved. For example, in the case where manufacturing all solid secondary batteries, the use of a disposable pouch can be omitted, and the use of a separate cushioning sheet can be omitted. Therefore, the steps of adding and removing the disposable pouch and adding the cushioning sheet may be omitted.

The present inventive concept described hereinafter may be modified in various ways, and may have many examples, and thus, certain examples are illustrated in the drawings, and are described in detail. The present inventive concept may, however, should not be construed as limited to the example embodiments set forth herein, and rather, should be understood as covering all modifications, equivalents, or alternatives falling within the scope of the present inventive concept.

The terms used herein is for the purpose of describing particular embodiments only, and is not intended to be limiting the present inventive concept. An expression used in the singular encompasses the expression of the plural, unless it has a clearly different meaning in the context. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The sign "/" used herein may be interpreted as "and", or as "or" depending on the context.

In the drawings, thicknesses may be magnified or exaggerated to clearly illustrate various layers and regions. Like reference numbers may refer to like elements throughout the drawings and the following description. It will be understood that when a layer, a film, a region, a sheet, etc. is referred to as being "on" another layer, another film, another region, another sheet, etc., it can be directly on the other element or intervening elements may be present therebetween. Although the terms "first," "second," etc. may be used herein to describe various elements, these elements should not be limited by these terms. These terms are only used to distinguish one element from another element. Components having substantially the same functional features in the present specification and drawings are denoted by the same reference numerals, and redundant description is omitted.

Hereinafter, all solid secondary batteries according to embodiments will be described in more detail.

5

[All Solid Secondary Batteries]

An all solid secondary battery according to an embodiment include: a stack which includes a positive electrode layer, a negative electrode layer; and a solid electrolyte layer disposed between the positive electrode layer and the negative electrode layer, wherein the positive electrode layer includes a positive electrode current collector and a positive electrode active material layer disposed on one surface or opposite surfaces of the positive electrode current collector, and the negative electrode layer includes a negative electrode current collector and a first negative electrode active material layer disposed on the negative electrode current collector, the first negative electrode active material layer does not contain a solid electrolyte, or an amount of the solid electrolyte contained in the negative electrode active material layer is 3 wt % or less of the total weight of the first negative electrode active material layer; and an exterior casing material for accommodating and sealing the stack, wherein the exterior casing material includes a first exterior casing material disposed on a first surface of the stack adjacent to the negative electrode layer and a second exterior casing material disposed on a second surface of the stack adjacent to the positive electrode layer, wherein the first exterior casing material includes a cushioning layer.

Since the first exterior casing material disposed adjacent to the negative electrode layer includes a cushioning layer, the volume change of the negative electrode layer where the volume change mainly occur during charging and discharging of an all solid secondary battery can be effectively tolerated, and thus, cracks inside an all solid secondary battery that occur during the charging and discharging process are suppressed. Therefore, the short circuit of an all solid secondary battery caused by internal cracks of the all solid secondary battery during charging and discharging of the all solid secondary battery may be suppressed. In addition, in the case where the volume of an all solid secondary battery is increased and then decreased during charging and discharging of the all solid secondary battery, the cushioning layer of the first exterior casing material applies a certain pressure to the all solid secondary battery so that the positive electrode layer/negative electrode layer and the solid electrolyte layer may be evenly adhered to each other. Therefore, the internal resistance of the all solid secondary battery is reduced, and as a result, the cycle characteristics of the all solid secondary battery are improved.

Referring to FIGS. 1 to 6, an all solid secondary battery 1 include: a stack 50 which includes a positive electrode layer 10, a negative electrode layer 20, and a solid electrolyte layer 30 disposed between the positive electrode layer 10 and the negative electrode layer 20, wherein the positive electrode layer 10 includes a positive electrode current collector 11 and a positive electrode active material layer 12 disposed on one surface or opposite surfaces of the positive electrode current collector 11, and the negative electrode layer 20 includes a negative electrode current collector 21 and the first negative electrode active material layer 22 disposed on the negative electrode current collector 21, wherein the first negative electrode active material layer 22 does not contain solid electrolyte, or the solid electrolyte content included in the first negative electrode active material layer 22 is 3 wt % or less of the total weight of the first negative electrode active material layer 22; and an exterior casing material 60 for accommodating and sealing the stack 50, wherein the exterior casing material 60 includes a first exterior casing material 61 disposed on a first surface 50A of the stack 50 adjacent to the negative electrode layer 20, and a second exterior casing material 62 disposed on a second surface 50B of the stack 50 opposing the first surface 50A, and the first exterior casing material 61 includes a cushioning layer.

[Exterior Casing Material]

Figure 2:
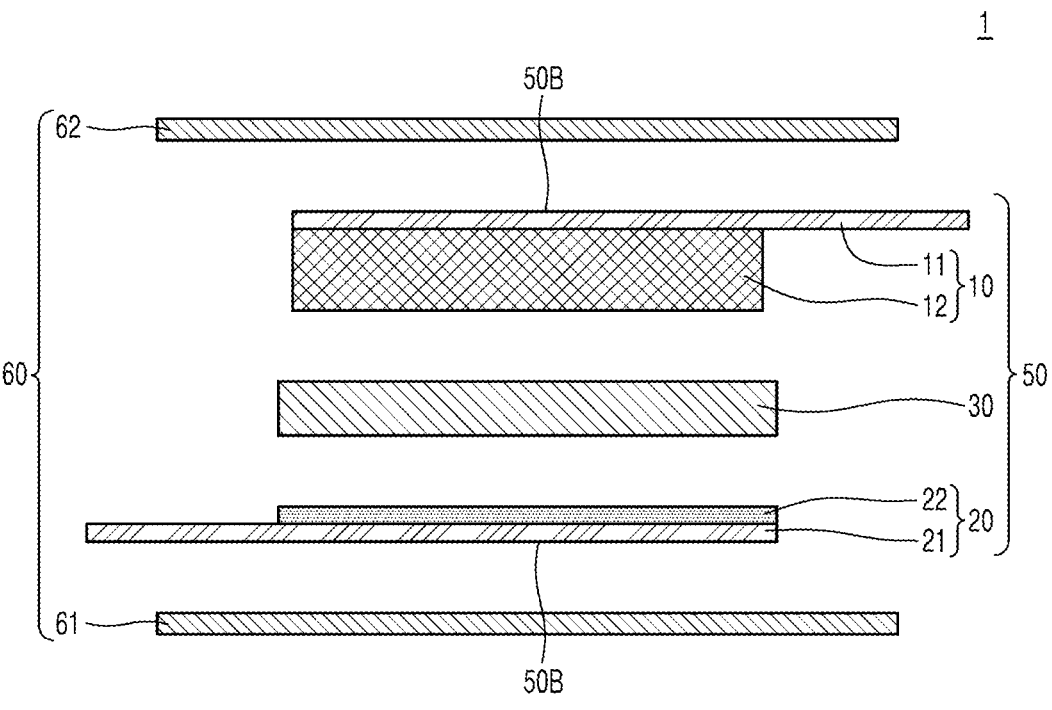
FIG. 2 is a cross-sectional exploded view of the monocell all solid secondary battery of FIG. 1.
Figure 3:
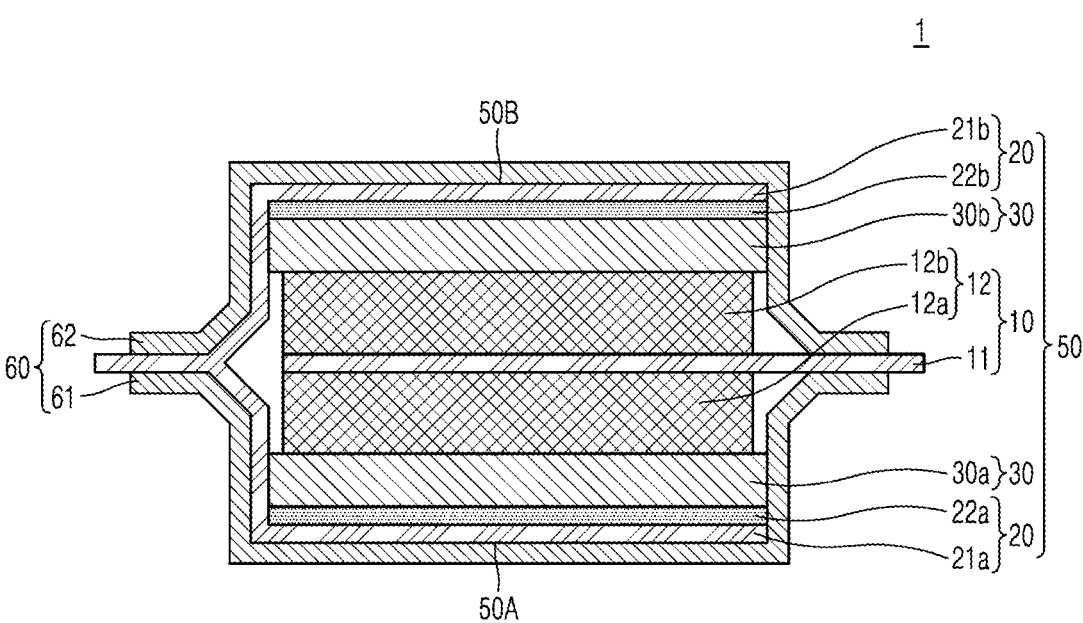
FIG. 3 is a cross-sectional view of a bi-cell all solid secondary battery according to an embodiment.
Figure 4:
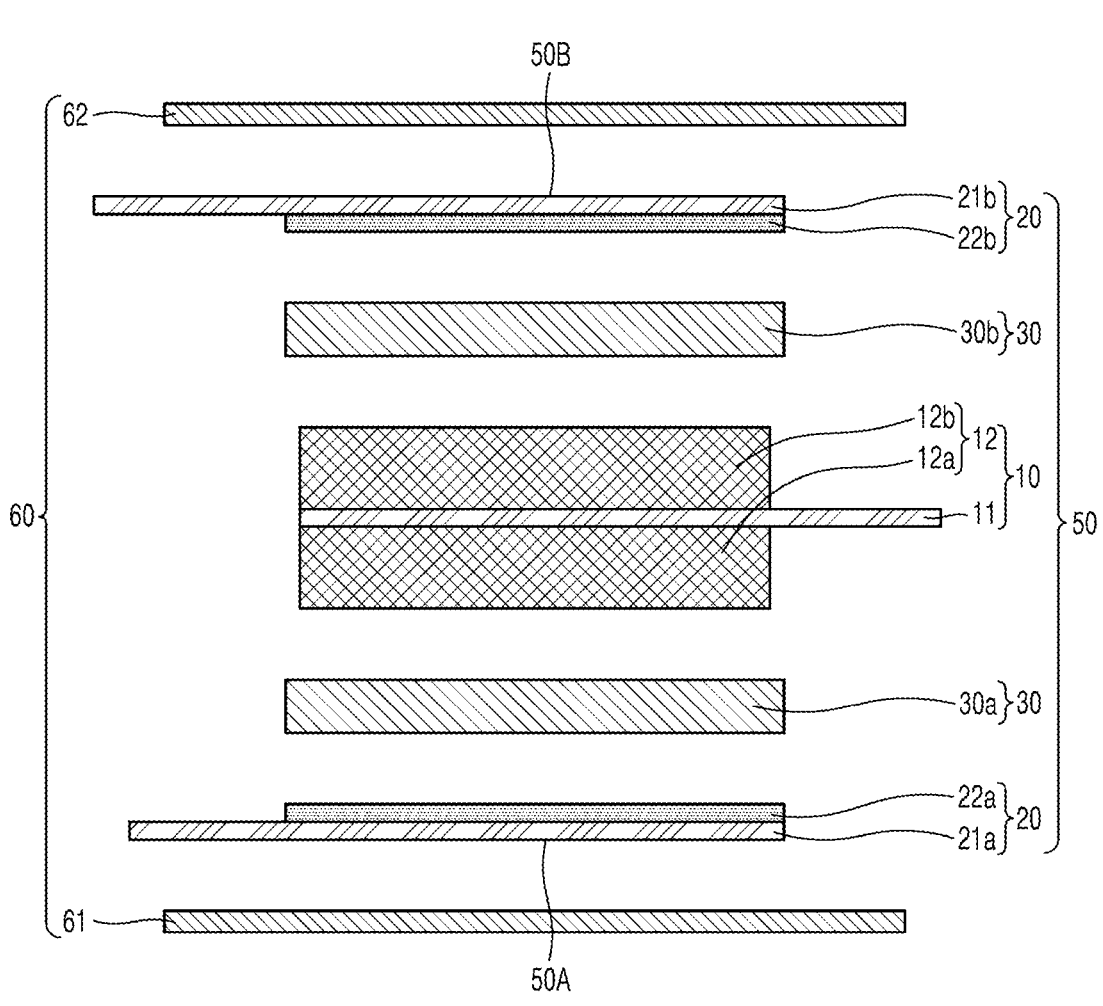
FIG. 4 is a cross-sectional exploded view of the bi-cell all solid secondary battery of FIG. 1.
Figure 5:
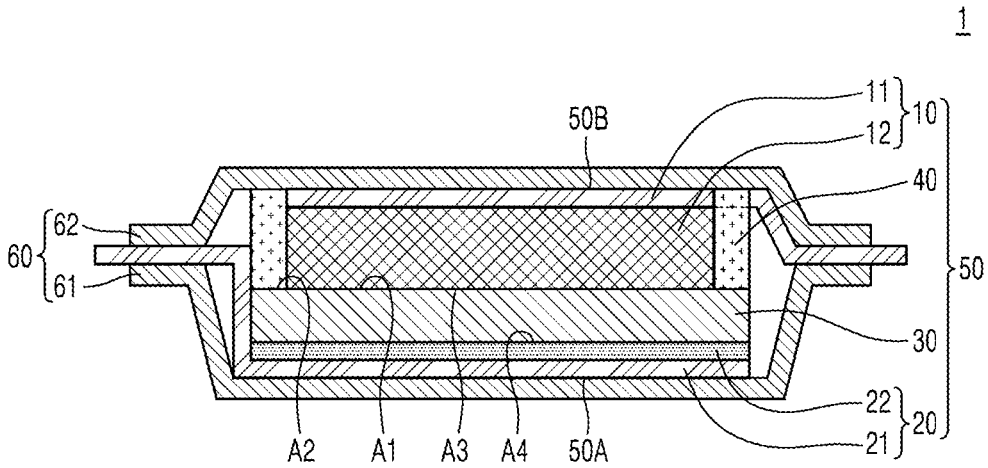
FIG. 5 is a cross-sectional view of a monocell all solid secondary battery according to an embodiment.
Figure 6:
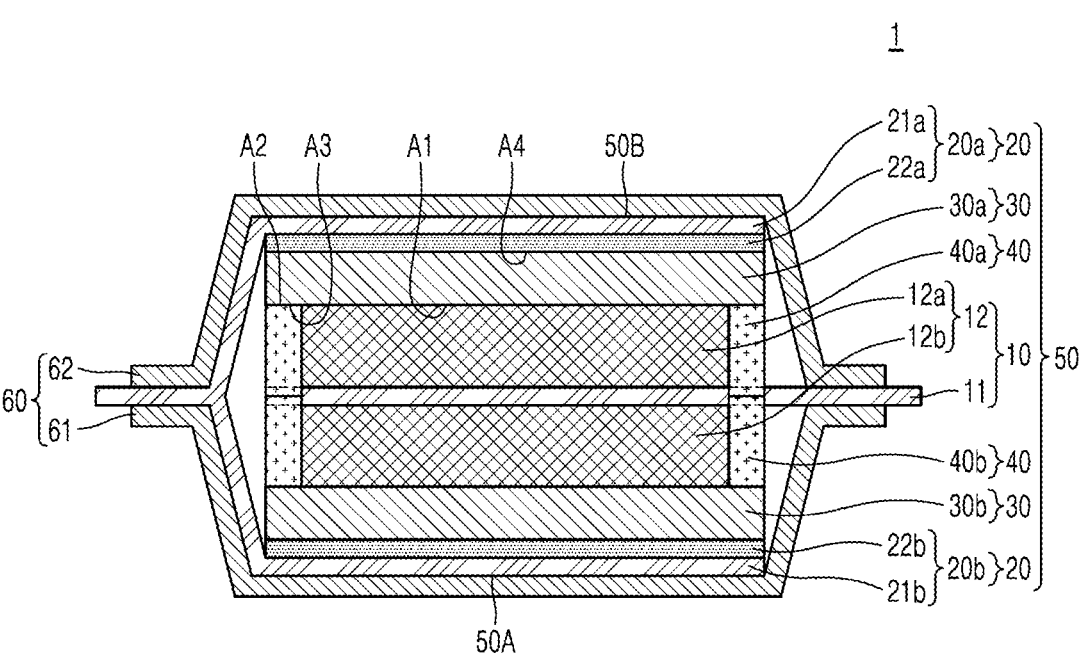
FIG. 6 is a cross-sectional view of a bi-cell all solid secondary battery according to an embodiment.

FIG. 1 is a cross-sectional view of a monocell all solid secondary battery according to an embodiment. FIG. 2 is a cross-sectional exploded view of the monocell all solid secondary battery of FIG. 1. FIG. 3 is a cross-sectional view of a bi-cell all solid secondary battery according to an embodiment. FIG. 4 is a cross-sectional exploded view of the bi-cell all solid secondary battery of FIG. 1. FIG. 5 is a cross-sectional view of a monocell all solid secondary battery according to an embodiment. FIG. 6 is a cross-sectional view of a bi-cell all solid secondary battery according to an embodiment.

Referring to FIGS. 1 to 6, the exterior casing material 60 accommodates and seals the stack 50. The exterior casing material 60 includes a first exterior casing material 61 disposed on a first surface 50A of the stack adjacent to the negative electrode layer 20, and a second exterior casing material 62 disposed on a second surface 50B of the stack opposing the first surface 50A. The first exterior casing material 61 includes a cushioning layer. In the case where the first exterior casing material 61 includes a cushioning layer, the change in volume may be effectively tolerated while the all solid secondary battery 1 is sealed. Therefore, the change in volume may be effectively tolerated during charging and discharging of the all solid secondary battery 1, and an increase in internal resistance of the all solid secondary battery 1 may be effectively prevented. In addition, since a separate cushioning member required for the all solid secondary battery 1 is unnecessary, the overall energy density of the all solid secondary battery 1 may be improved.

The compression elastic modulus of the cushioning layer may be, for example, 0.1 MPa to 100 MPa, 0.1 MPa to 50 MPa, 0.1 MPa to 30 MPa, 0.1 MPa to 10 MPa, 0.1 MPa to 5 MPa, 0.1 MPa to 3 MPa, 0.1 MPa to 2 MPa, or 0.1 MPa to 1 MPa. In the case where the cushioning layer has these ranges of the compression elastic moduli, a short circuit can be prevented during charging and discharging of the all solid secondary battery 1 and cycle characteristics can be further increased.

The deformation rate of the cushioning layer represented by Equation 1 below at 10 MPa load may be, for example, 50% to 99%, 50% to 95%, or 50% to 90%.

In the case where the cushioning layer has these ranges of the deformation rate, the cushioning layer can effectively tolerate the volume change during charging and discharging of the all solid secondary battery 1.

$$\text{Deformation rate} = 100 - (T2/T1) \times 100 \qquad \text{Equation 1}$$

wherein T1 indicates a thickness of the cushioning layer when no stress is applied, and T2 indicates a thickness of the cushioning layer when stress reaches 10 MPa.

The 50% compression force deflection (CFD) of the cushioning layer according to ASTM D3574 may be, for example, 0.25 MPa to 0.55 MPa, 0.30 MPa to 0.50 MPa, or 0.3 MPa to 0.45 MPa. In the case where the cushioning layer has these ranges of the compression force deflection, the increase in the internal resistance in the all solid secondary battery or the poor contact, due to the decrease in volume during discharge of the all solid secondary battery 1, may be effectively prevented.

The stress relaxation rate of the cushioning layer represented by Equation 2 below may be, for example, 3% to 25%, 3% to 20%, or 5% to 15%. In the case where the cushioning layer has these ranges of stress relaxation rate, the change in volume of the cushioning layer according to the increase in the volume of the all solid secondary battery 1 during charging, may be easily absorbed, and the charge efficiency may be increased. In addition, when the initial pressure is applied to the stack including the positive electrode layer, the negative electrode layer, and the solid electrolyte layer in the manufacture of all solid secondary batteries, the deformation applied to the positive electrode layer, the solid electrolyte layer, and the negative electrode layer may be easily absorbed. Therefore, an increase in the internal resistance of an all solid secondary battery due to the decrease in volume during discharging may be effectively suppressed.

$$\text{Stress relaxation rate} = \left[(S1 - S2)/S1\right] \times 100 \qquad \text{Equation 2}$$

wherein SI indicates a first stress measured when a first point is reached by compression by 50% of the initial thickness and then a second point was reached from the first point by additional compression by 13.33% of the initial thickness.

S2 indicates a second stress measured after 60 seconds lapse from the time of measuring the first stress.

The compression recovery ratio of the cushioning layer in the thickness direction, represented by Equation 3, may be 65% to 99%, 65% to 95%, 65% to 90%, or 65% to 85%. In the case where the cushioning layer has these ranges of the compression recovery ratio, the volume change during charging and discharging of the all solid secondary battery 1 may be effectively tolerated. Therefore, internal cracks of the all solid secondary batteries 1 including these cushioning layers can be suppressed and cycle characteristics may be increased.

$$\text{Compression recovery ratio} = AA2/AA1 \times 100C \qquad \text{Equation 3}$$

wherein AA1 indicates a third stress measured at a first point which is reached by compression by 50% of the initial thickness, and AA2: a fourth stress measured when the second point is reached by additional compression by 13.33% of the initial thickness from the first point, and then, after 60 seconds lapse at the second point, the first point was reached back by the relaxation from the second point.

The thickness of the first exterior casing material 61 may be, for example, 1 μm to 5000 μm, 10 μm to 1000 μm, 10 μm to 500 μm, 50 μm to 500 μm, or 100 μm to 500 μm. In the case where the first exterior casing material 61 has these ranges of thicknesses, the internal cracks of the all solid secondary battery 1 including the first exterior casing material are suppressed and cycle characteristics thereof may be further increased. The thickness of the cushioning layer may be, for example, 1 μm to 1000 μm, 10 μm to 800 μm, 10 μm to 400 μm, 50 μm to 400 μm, or 100 μm to 400 μm. In the case where the cushioning layer has these ranges of thicknesses, the internal cracks of the all solid secondary battery 1 including the cushioning layer are suppressed and cycle characteristics thereof may be further increased. The thickness of the cushioning layer may be, for example, 1/10 to 10/10, 1/10 to 8/10, 1/10 to 5/10, 1/10 to 3/10, or 1/10 to 2/10, based on the total thickness of first exterior casing material 61.

The first exterior casing material 61 may further include one or more selected from a metal layer and a polymer layer. The metal layer may be, for example, an aluminum layer, but is not necessarily limited to aluminum, and any metal that used for an exterior casing material in the art may be used. The thickness of the metal layer may be, for example, 1/10 to 5/10, 1/10 to 3/10, or 1/10 to 2/10, of the total thickness of the first exterior casing material 61.

The polymer layer includes a polymer, and the polymer may be, for example, polyethylene terephthalate, nylon, polypropylene, polyethylene, etc., but is not necessarily limited thereto, and any polymer that is used for exterior casing material in the art, may be used herein. The thickness of the polymer layer may be, for example, 1/10 to 5/10, 1/10 to 3/10, or 1/10 to 2/10, of the total thickness of the first exterior casing material 61. The moisture and/or gas permeability of the polymer may be, for example, 10 cc·20·μm/m²·24 h atm or less. The moisture and/or gas permeability of the polymer may be, for example, 0.01 cc·20·μm/m²·24 h·atm to 10 cc·20·μm/m²·24 h·atm, 0.01 cc·20·μm/m²·24 h·atm to 5 cc·20·μm/m²·24 h·atm, 0.01 cc·20·μm/m²·24 h·atm to 1 cc·20·μm/m²·24 h·atm, or 0.1 cc·20·μm/m²·24 h·atm to 1 cc·20·μm/m²·24 h·atm.

The first exterior casing material 61 may have, for example, a single-layer structure or a multi-layer structure. The multi-layer structure may have, for example, a 2-layer structure to a 50-layer structure. The multi-layer structure may have, for example, a 2-layer structure, a 3-layer structure, a 4-layer structure, a 5-layer structure, a 6-layer structure, and the like. The multi-layer structure may contain one or more cushioning layers. The multi-layer structure may include, for example, one or more metal layers and/or one or more polymer layers. The multi-layer structure may have, for example, a polymer layer/cushioning layer structure, a polymer layer/metal layer/cushioning layer structure, a metal layer/cushioning layer structure, a polymer layer/ cushioning layer/polymer layer structure, and the like. The multi-layer structure may have, for example, a polymer layer/first cushioning layer/polymer layer/second cushioning layer structure. The cushioning layer included in the first exterior casing material 61 may be, for example, a porous layer. The porous layer may be, for example, a layer containing hollow particles or a layer into which pores are introduced. The first exterior casing material 61 may include layers with opposite physical properties to balance physical properties as long as the moisture and gas performance and the cushioning performance required by the all solid secondary battery 1 are provided.

The second exterior casing material 62 may include one or more selected from a cushioning layer, a metal layer and a polymer layer. The second exterior casing material 62 may have the same structure, thickness, and properties as the first exterior casing material 61. Details of the second exterior casing material 62 may include the description provided in connection with the first exterior casing material 61. The second exterior casing material 62 may not contain a cushioning layer.

The exterior casing material 60 includes a sealing portion disposed along the outer edges (e.g., outer periphery) of the first exterior casing material 61 and the second exterior casing material 62, and the sealing portion may further include an adhesive layer disposed between the first exterior casing material 61 and the second exterior casing material 62, or a fused portion where the first exterior casing material 61 and the second exterior casing material 62 are fused to each other. Due to the adhesion or fusion made along the outer edges of the first exterior casing material 61 and the second exterior casing material 62, the stack 50 may be sealed while being housed.

[Positive Electrode Layer]

[Positive Electrode Layer: Inactive Member]

FIG. 5 is a cross-sectional view of a monocell all solid secondary battery according to an embodiment. FIG. 6 is a cross-sectional view of a bi-cell all solid secondary battery according to an embodiment.

Referring to FIG. 5, the positive electrode layer 10 includes a positive electrode current collector 11 and a positive electrode active material layer 12 disposed on one surface of the positive electrode current collector. An inactive member 40 may be disposed on one side of the positive electrode layer 10. The inactive member 40 is disposed surrounding the side of the positive electrode layer 10. In the case where the inactive member 40 is included, during manufacturing and/or during charging and discharging of the all solid secondary battery 1, cracking of the solid electrolyte layer 30 is prevented, and as a result, the cycle characteristics of the all solid secondary battery 1 is improved. In the case where the all solid secondary battery 1 that does not contain the inactive member 40, during manufacturing and/or charging and discharging of the all solid secondary battery 1, cracks may occur in the solid electrolyte layer 30 by applying uneven pressure to the solid electrolyte layer 30 in contact with the positive electrode layer 10, resulting in the occurrence of a short circuit.

Referring to FIG. 5, an area A1 of the positive electrode layer 10 is smaller than an area A3 of the solid electrolyte layer 30 in contact with the positive electrode layer 10, and the inactive member 40 surrounds the side of the positive electrode layer 10 to compensate for some or all of the area difference between the positive electrode layer 10 and the solid electrolyte layer 30. In the case where an area A2 of the inactive member 40, which is flame retardant, compensates for some or all of the difference between the area A1 of the positive electrode layer 10 and the area A3 of the solid electrolyte layer 30, the cracking of the solid electrolyte layer 30 that occurs by the pressure difference during the pressing process, can be effectively suppressed. For example, the sum of area A1 of the positive electrode layer 10 and the area A2 of the inactive member 40 may be 90% to 100% or 95% to 99% of the area A3 of solid electrolyte layer 30.

The area A1 of the positive electrode layer 10 may be, for example, 80% to 99.9%, 85% to 99%, 90% to 99%, or 95% to 99% of the area A3 of the solid electrolyte layer 30. In the case where the area A1 of the positive electrode layer 10 is equal to or greater than the area A3 of the solid electrolyte layer 30, a short circuit may occur due to physical contact between the positive electrode layer 10 and the first negative electrode active material layer 22, or a short circuit may occur due to overcharging of lithium. The area A1 of the positive electrode layer 10 may be, for example, equal to the area of the positive electrode active material layer 12.

The area A2 of the inactive member 40 may be 1% to 50%, 1% to 40%, 1% to 20%, 1% to 10%, or 1% to 5%, of the area A1 of the positive electrode layer 10.

The area A1 of the positive electrode layer 10 is smaller than the area A4 of the first negative electrode active material layer 22. The area A1 of the positive electrode layer 10 may be, for example, 80% to 99.9%, 85% to 99%, 90% to 99%, or 95% to 99% of the area A4 of the first negative electrode active material layer 22.

The area of the negative electrode layer 20 may be, for example, the same as the area A4 of the first negative electrode active material layer 22.

The terms "same" area, length, width, thickness and/or shape used herein include "substantially the same" area, length, width, thickness and/or shape, except for the case where areas, lengths, widths, thicknesses and/or shapes are intentionally designed to be different from each other. The "same" area, length, width and/or thickness may include a case where the unintended difference in area, length, width and/or thickness of the objects being compared is, for example, less than 1%, less than 0.5%, or less than 0.1%.

The inactive member 40 may be, for example, a gasket. In the case where a gasket is used as the inactive member 40, the cracking of the solid electrolyte layer 30 caused by the pressure difference during the pressing process can be effectively suppressed.

The inactive member 40 may have, for example, a monolayer structure. Alternatively, although not shown in the drawings, the inactive member 40 may have a multi-layer structure. In the case where the inactive member 40 has the multi-layer structure, the respective layers thereof may have different compositions. An inactive member having a multi-layer structure may have, for example, a 2-layer structure, a 3-layer structure, a 4-layer structure, or a 5-layer structure. The inactive member 40 having a multi-layer structure may include, for example, one or more adhesive layers and one or more support layers. An adhesive layer effectively prevents the separation between the positive electrode layer 10 and the solid electrolyte layer 30 due to the change in volume of the positive electrode layer 10 that occurs during the charging and discharging process of the all solid secondary battery 1, and provides a binding force between the support layer and other layers to enhance the film strength of the inactive member 40. The support layer provides a supporting force to the inactive member 40, prevents unevenness of pressure applied to the solid electrolyte layer 30 during the pressing process or the charging/discharging process, and prevents the deformation of the shape of the all-solid secondary battery 1.

Referring to FIG. 6, the all solid secondary battery 1 includes a positive electrode layer 10, a negative electrode layer 20, and a solid electrolyte layer 30 disposed therebetween, wherein the positive electrode layer 10 includes a positive electrode current collector 11 and a first positive electrode active material layer 12a and a second positive electrode active material layer 12b which are respectively disposed on opposite surfaces of the positive electrode current collector 11, the solid electrolyte layer 30 includes a first solid electrolyte layer 30a in contact with the first positive electrode active material layer 12a and a second solid electrolyte layer 30b in contact with the second positive electrode active material layer 12b, the negative electrode layer 20 includes a first negative electrode layer 20a in contact with the first solid electrolyte layer 30a and a second negative electrode layer 20b in contact with the second solid electrolyte layer 30b, and the inactive member 40 is configured to surround the side of the positive electrode layer 10 between the first solid electrolyte layer 30a and the second solid electrolyte layer 30b, which face each other. For example, a first inactive member 40a and a second inactive member 40b are each disposed surrounding the side of the positive electrode layer 10. A positive electrode terminal extends outward from one side of the positive electrode layer 10, and a negative electrode terminal extends outward from one side of the negative electrode layer 20.

The all solid secondary battery 1 has a bi-cell structure. In the case where the all solid secondary battery 1 has such a bi-cell structure, the solid electrolyte layer 30 and the negative electrode layer 20 are symmetrically arranged facing each other around the positive electrode layer 10, so that the structural deformation caused by the pressure applied during the manufacture of the all solid secondary battery 1 may be effectively suppressed. Therefore, the cracking of the solid electrolyte layer 30 is suppressed during the manufacturing process and/or charge/discharge process of the all solid secondary battery 1, thereby preventing a short circuit of the all solid secondary battery 1, and as a result, improving the cycle characteristics of the all solid secondary battery 1. In addition, since a plurality of positive electrode active material layers (for example, the first positive electrode active material layer 12$a$ and the second positive electrode active material layer 12$b$) share a single positive electrode current collector (for example, the positive electrode current collector 11), the energy density of the all solid secondary battery 1 is increased.

Referring to FIGS. 5 to 6, the inactive member 40 may be, for example, a flame retardant inactive member. Since the flame retardant inactive member provides flame retardancy, thermal runaway and ignition of the all solid secondary battery are prevented and thus, the safety of the all solid secondary battery may be further increased. In addition, the flame retardant inactive member absorbs residual moisture in the all solid secondary battery to prevent deterioration of the all solid secondary battery, thereby improving the lifespan characteristics of the all solid secondary battery.

The flame retardant inactive member includes a matrix and a filler. The matrix may include, for example, a base material and a reinforcement. The matrix may include, for example, a fibrous base material and a fibrous reinforcement. In the case where the matrix includes the base material, the matrix may have elasticity. Therefore, the matrix may effectively tolerate the volume change of the all solid secondary battery 1 during charging and discharging thereof and may be placed in various positions. The substrate included in the matrix may include, for example, a first fibrous material. In the case where the base material includes the first fibrous material, the volume change of the positive electrode layer 10 occurring during the charging and discharging process of the all solid secondary battery 1 is effectively tolerated, and the deformation of the inactive member 40, which is flame retardant, caused by the volume change of the positive electrode layer 10 may be effectively suppressed. The first fibrous material may be, for example, a material having an aspect ratio of 5 or more, 20 or more, or 50 or more. The first fibrous material may be, for example, a material with an aspect ratio of 5 to 1000, 20 to 1000, or 50 to 1000. The first fibrous material may be, for example, an insulating material. Since the first fibrous material is an insulating material, a short circuit between the positive electrode layer 10 and the negative electrode layer 20 caused by, for example, lithium dendrites generated during the charging and discharging process of the all solid secondary battery 1 may be effectively prevented. The first fibrous material may include, for example, one or more selected from pulp fibers, insulating polymer fibers, and ion conductive polymer fibers. Since the matrix has the reinforcing material, the strength of the matrix may be enhanced. Therefore, the matrix may prevent excessive volume change of the all solid secondary battery 1 during charging and discharging and prevent the deformation of the all solid secondary battery. The reinforcing material included in the matrix includes, for example, a second fibrous material. In the case where the reinforcing material includes the second fibrous material, the strength of the matrix may be increased more uniformly. The second fibrous material may be, for example, a material with an aspect ratio of 3 or more, 5 or more, or 10 or more. The second fibrous material may be, for example, a material with an aspect ratio 3 to 100, 5 to 100, or 10 to 100. The second fibrous material may be, for example, a flame retardant material. In the case where the second fibrous material is a flame retardant material, ignition due to thermal runaway of the all solid secondary battery 1 caused by the charge and discharge process of or external impact can be effectively suppressed. The second fibrous material may be, for example, glass fibers, metal oxide fibers, and ceramic fibers. Glass fibers are classified according to the composition of metal oxide constituting the glass. Glass fibers may be, for example, silicate glass fibers and the like. Metal oxide fibers may be, for example, silica ($SiO_2$) fibers, alumina ($Al_2O_3$) fibers, and bohemite fibers. Ceramic fibers may be, for example, silicon carbide fibers. The flame retardant inactive member may include a filler in addition to the matrix. Fillers may be placed inside the matrix, on the surface of the matrix, or both inside and on the surface. Fillers may be, for example, inorganic materials. A filler included in a flame retardant inactive member may be, for example, a moisture getter. The filler adsorbs moisture at a temperature of less than 100° C., so that the moisture remaining in the all solid secondary battery 1 is removed and the deterioration of the all solid secondary battery 1 may be prevented. In addition, in the case where the temperature of the all solid secondary battery 1 is raised to 150° C. or more due to the thermal runaway of the all solid secondary battery 1 caused by the charge and discharge process of or external impact, the filler releases the adsorbed moisture to effectively suppress the ignition of the all solid secondary battery 1. That is, the filler may be, for example, a flame retardant. The filler may be, for example, a metal hydroxide having moisture adsorption properties. Metal hydroxides included in the filler may be, for example, $Mg(OH)_2$, $Fe(OH)_3$, $Sb(OH)_3$, $Sn(OH)_4$, $Tl(OH)_3$, $Zr(OH)_4$, $Al(OH)_3$ or a combination thereof. The amount of the filler included in the flame retardant inactive member may be, for example, based on 100 parts by weight of the flame retardant inactive member, in the range of 10 parts by weight to 80 parts by weight, 20 parts by weight to 80 parts by weight, 30 parts by weight to 80 parts by weight, 40 parts by weight to 80 parts by weight, 50 parts by weight to 80 parts by weight, 60 parts by weight parts by weight to 80 parts by weight, or 65 parts by weight to 80 parts by weight. The flame retardant inactive member may include, for example, a binder. The binder may include, for example, a curable polymer. A curable polymer is a polymer that is cured by heat and/or pressure. Curable polymers may be, for example, solid at room temperature. The flame retardant inactive member may include, for example, heat-pressing curable films and/or cured products thereof. A heat-pressing curable polymer may be TSA-66 from Toray Inc.. Alternatively, the binder may include a general binder used in the art. The binder may be, for example, a fluorine-based binder such as polyvinylidene fluoride or an acrylic binder such as polyacrylate. The amount of the binder included in the flame retardant inactive member may be, for example, 1 part by weight to 10 parts by weight, 1 part by weight to 5 parts by weight, or 1 part by weight to 3 parts by weight, based on 100 parts by weight of the flame retardant inactive member. The density of the base material or reinforcing material included in the flame retardant inactive member may be 10% to 300%, 10% to 150%, 10% to 140%, 10% to 130%, or 10% to 120%. A flame retardant inactive member may be a member that does not contain an electrochemically active material, for example an electrode active material. The electrode active material may be a material that occludes/releases lithium. The flame retardant inactive member may include, in addition to a material other than electrode active material, any member that is used in the art.

[Positive Electrode Layer: Positive Electrode Active Material]

The positive electrode active material layer 12 may include, for example, a positive electrode active material and a solid electrolyte. The solid electrolyte contained in the positive electrode layer 10 is similar to or different from the solid electrolyte contained in the solid electrolyte layer 30. The solid electrolyte is the same as described in connection with the solid electrolyte layer 30 provided above.

A positive electrode active material is a positive electrode active material that can reversibly absorb and desorb lithium ions. The positive electrode active material may be, for example, lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganese oxide, lithium iron phosphate; nickel sulfide, copper sulfide, lithium sulfide, iron oxide, or vanadium oxide, and is not necessarily limited thereto. The positive electrode active material may be any material that is used as a positive electrode active material in the art. These positive electrode active materials may be used alone or in combination of two or more of these.

The lithium transition metal oxide may be, for example, a compound represented by one of the following formulae: $Li_aA_{1-b}B_bD_2$ (where $0.90 \leq a \leq 1$, and $0 \leq b \leq 0.5$); $Li_aE_{1-b}B_bO_{2-c}D_c$ (where $0.90 \leq a \leq 1$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1$, $0 \leq b \leq 0.5$, $0 \leq c < 0.05$, and $0 < \alpha < 2$); $Li_aN_{ib}E_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$. Regarding these compounds, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof. A coating layer may be added to each of these compounds, or these compounds may be used together with a compound to which a coating layer is added. The coating layer provided on the surface of these compound may include a coating element compound such as an oxide of a coating element, a hydroxide of a coating element, an oxyhydroxide of a coating element, an oxycarbonate of a coating element, or a hydroxycarbonate of a coating element. The compound constituting the coating layer may be amorphous or crystalline. The coating element included in the coating layer may be Mg, Al, Co, K, Na, Ca, Si, Ti, V, Sn, Ge, Ga, B, As, Zr, or a mixture thereof. A method of forming the coating layer may be selected within a range that does not adversely affect the physical properties of the positive electrode active material. The coating method may be, for example, spray coating, dipping method, or the like. A detailed description of the coating method will be omitted because it may be well understood by those in the art.

The positive electrode active material may include, for example, a lithium salt of a transition metal oxide having a layered rock salt type structure from among the these lithium transition metal oxides. The term "layered rock salt structure" refers to, for example, a structure in which an oxygen atom layer and a metal atom layer are alternately and regularly arranged in the <111> direction of a cubic rock salt type structure so that each atomic layer forms a two-dimensional plane. The term "cubic rock salt structure" refers to a NaCl type structure, which is a type of crystal structure, in which face centered cubic lattice (fcc) formed by each of a cation and an anion are displaced with respect to each other by 1/2 of the ridge of a unit lattice. A lithium transition metal oxide having such a layered rock salt structure may be, for example, a ternary lithium transition metal oxide, such as $LiNi_xCo_yAl_zO_2$ (NCA) or $LiNi_xCo_yMn_zO_2$ (NCM)($0<x<1$, $0<y<1$, $0<z<1$, and $x+y+z=1$). In the case where the positive electrode active material includes a ternary lithium transition metal oxide having a layered rock salt structure, the energy density and thermal stability of the all solid secondary battery 1 may be further improved.

The positive electrode active material may be covered by the coating layer as described above. The coating layer may be any coating layer that is known as a coating layer of a positive electrode active material for an all-solid-state secondary battery. The coating layer may be, for example, $Li_2O—ZrO_2$ (LZO).

In the case where the positive electrode active material is a ternary lithium transition metal oxide containing nickel (Ni), such as for example NCA or NCM, the capacity density of the all solid secondary battery 1 is increased and the metal elution of the positive electrode active material in the charged state may be reduced. As a result, cycle characteristics of the all solid secondary battery 1 in the charged state are improved.

The shape of the positive electrode active material is, for example, a particle shape such as a true sphere, and an elliptical sphere. The particle size of the positive electrode active material is not particularly limited, and is within such a range that is applicable to a positive electrode active material for all solid secondary batteries of the art. The amount of the positive electrode active material of the positive electrode layer 10 is not particularly limited, and may be within such a range that is applicable to a positive electrode layer for all solid secondary batteries of the art.

[Positive Electrode Layer: Solid Electrolyte]

The positive electrode active material layer 12 may contain, for example, a solid electrolyte. The solid electrolyte contained in the positive electrode layer 10 may be similar to or different from the solid electrolyte contained in the solid electrolyte layer 30. The solid electrolyte is the same as described in connection with the solid electrolyte layer 30 provided above.

The D50 average particle diameter of the solid electrolyte contained in the positive electrode active material layer 12 may be smaller than that of the solid electrolyte contained in the solid electrolyte layer 30. For example, the D50 average particle diameter of the solid electrolyte contained in the positive electrode active material layer 12 may be 90% or less, 80% or less, 70% or less, 60% or less, 50% or less, 40% or less, 30% or less, or 20% or less, of the D50 average particle diameter of the solid electrolyte contained in the solid electrolyte layer 30.

The D50 average particle diameter may be, for example, the median particle diameter (D50). The median particle diameter (D50) indicates, for example, a particle size corresponding to a 50% cumulative volume calculated from particles having a smaller particle size in the particle size distribution measured by the laser diffraction method.

[Positive Electrode Layer: Binder]

The positive electrode active material layer 12 may include a binder. The binder may be, for example, styrene butadiene rubber (SBR), polytetrafluoroethylene, polyvinylidene fluoride, polyethylene, etc., and is not limited thereto. The binder may be any binder that is used as a binder in the art.

[Positive Electrode Layer: Conductive Material]

The positive electrode active material layer 12 may include a conductive material. The conductive material may be, for example, graphite, carbon black, acetylene black, Ketjen black, carbon fiber, metal powder, etc., and is not limited thereto. The conductive material may be any material that is used as a conductive material in the art.

[Positive Electrode Layer: Other Additives]

The positive electrode active material layer 12 may further include additives such as a filler, a coating agent, a dispersing agent, and an ion conductive auxiliary agent, in addition to the positive electrode active material, the solid electrolyte, the binder, and the conductive material.

As for a filler, a coating agent, a dispersing agent, and an ion conductive auxiliary agent, which may be included in the positive electrode active material layer 12, any material that is known and used in an electrode for an all solid secondary battery in general.

[Positive Electrode Layer: Positive Electrode Current Collector]

The positive electrode current collector 11 may be, for example, a plate or a foil, each which consists of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy of these. The positive electrode current collector 11 may be omitted. The thickness of the positive electrode current collector 11 may be, for example, 1 μm to 100 μm, 1 μm to 50 μm, 5 μm to 25 μm, or 10 μm to 20 μm.

[Solid Electrolyte Layer]

[Solid Electrolyte Layer: Solid Electrolyte]

Referring to FIGS. 1 to 6, the solid electrolyte layer 30 disposed between the positive electrode layer 10 and the negative electrode layer 20 may include a solid electrolyte.

The solid electrolyte may be, for example, a sulfide-based solid electrolyte. The sulfide-based solid electrolyte may be, for example, one or more selected from $Li_2S$—$P_2S_5$, $Li_2S$—$P_2S_5$—LiX where X is a halogen element, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ where m and n are each a positive number, and Z is one of Ge, Zn, or Ga, $Li_2S$—$GeS_2$, $Li_2S$—$SiS_2$—$Li_3PO_4$, $Li_2S$—$SiS_2$-$Li_pMO_q$, p and q are each a positive number, M is one of P, Si, Ge, B, Al, Ga, In, $Li_{7-x}PS_{6-x}Cl_x$ where $0≤x≤2$, $Li_{7-x}PS_{6-x}Br_x$ where $0≤x≤2$, and $Li_{7-x}PS_{6-x}Ix$ where $0≤x≤2$. A sulfide-based solid electrolyte may be produced by, for example, processing starting materials such as $Li_2S$ and $P_2S_5$ by a melt quenching method or a mechanical milling method. Further, after this treatment, heat treatment may be performed. The solid electrolyte may be amorphous, crystalline, or a mixture thereof. In addition, the solid electrolyte may be the sulfide-based solid electrolyte materials described above which include, as a constituent element, at least sulfur (S), phosphorus (P), and lithium (Li). For example, the solid electrolyte may be a material containing $Li_2S$—$P_2S_5$. In the case where a material containing $Li_2S$—$P_2S_5$ is used as a sulfide-based solid electrolyte material that forms a solid electrolyte, the mixing molar ratio of $Li_2S$ and $P_2S_5$ may be, for example, in the range of $Li_2S$: $P_2S_5$=50:50 to 90:10.

The sulfide-based solid electrolyte may include, for example, an Argyrodite type solid electrolyte represented by Formula 1:

$$Li^+_{12-n-x}A^{n+}X^{2-}_{6-x}Y^-_x \qquad \text{Formula 1}$$

where A is P, As, Ge, Ga, Sb, Si, Sn, Al, In, Ti, V, Nb, or Ta, X is S, Se, or Te, Y is Cl, Br, I, F, CN, OCN, SCN, or $N_3$, and $1≤n≤5$ and $0≤x≤2$. The sulfide-based solid electrolyte may be, for example, an Argyrodite-type compound containing one or more selected from $Li_{7-x}PS_{6-x}Cl_x$ where $0≤x≤2$, $Li_{7-x}PS_{6-x}Br_x$ where $0≤x≤2$, and $Li_{7-x}PS_{6-x}Ix$ where $0≤x≤2$. The sulfide-based solid electrolyte may be, for example, an Argyrodite-type compound including one or more selected from among $Li_6PS_5Cl$, $Li_6PS_5Br$, and $Li_6PS_5I$.

The density of an Argyrodite-type solid electrolyte may be 1.5 g/cc to 2.0 g/cc. In the case where the Argyrodite-type solid electrolyte has the density of 1.5 g/cc or more, the internal resistance of all solid secondary batteries is reduced, and the penetration of Li through the solid electrolyte layer may be effectively suppressed.

[Solid Electrolyte Layer: Binder]

The solid electrolyte layer 30 may include, for example, a binder. The binder included in the solid electrolyte layer 30 may be, for example, styrene butadiene rubber (SBR), polytetrafluoroethylene, polyvinylidene fluoride, polyethylene, etc., but is not limited thereto. The binder may be any material that is used as a binder in the art. The binder of the solid electrolyte layer 30 may be the same as or different from the binders included in the positive electrode active material layer 12 and the first negative electrode active material layer 22. The binder may be omitted.

The amount of the binder included in the solid electrolyte layer 30 may be 0 wt % to 10 wt %, 0 wt % to 5 wt %, 0 wt % to 3 wt %, 0 wt % to 1 wt %, 0 wt % to 0.5 wt %, or 0 wt % to 0.1 wt %, based on the total weight of the solid electrolyte layer 30.

[Negative Electrode Layer]

[Negative Electrode Layer: Negative Electrode Active Material]

The first negative electrode active material layer 22 may further include, for example, a negative electrode active material and a binder.

The negative electrode active material included in the first negative electrode active material layer 22 may have, for example, a particle shape. The average particle diameter of the negative electrode active material having a particle shape may be, for example, 4 μm or less, 3 μm or less, 2 μm or less, 1 μm or less, or 900 nm or less. The average particle diameter of the negative electrode active material having a particle shape may be, for example, 10 nm to 4 μm or less, 10 nm to 3 μm or less, 10 nm to 2 μm or less, 10 nm to 1 μm or less, or 10 nm to 900 nm or less. In the case where the negative electrode active material has these ranges of an average particle diameter, reversible absorbing and/or desorbing of lithium may be more easily performed during charging and discharging. The average particle diameter of the negative electrode active material may be, for example, a median diameter (D50) measured using a laser type particle size distribution meter.

The negative electrode active material included in the first negative electrode active material layer 22 may include, for example, one or more selected from a carbon-based negative electrode active material and a metal or metalloid negative electrode active material.

The carbon-based negative electrode active material may be amorphous carbon. Amorphous carbon may be, for example, carbon black (CB), acetylene black (AB), furnace black (FB), Ketjen black (KB), graphene, etc., and is not limited thereto. The amorphous carbon may be any material that is classified as amorphous carbon in the art. Amorphous carbon is a carbon that does not have crystallinity or has very low crystallinity, and is distinguished from crystalline carbon or graphite-based carbon.

Metal or metalloid negative electrode active materials include one or more selected from the group consisting of gold (Au), platinum (Pt), palladium (Pd), silicon (Si), silver (Ag), aluminum (Al), bismuth (Bi), tin (Sn) and zinc (Zn), and is not necessarily limited thereto. The metal or metalloid negative electrode active materials may be any material that is used as a metal negative electrode active material or a metalloid negative electrode active material, each of which forms an alloy or compound with lithium in the art. For example, since nickel (Ni) does not form an alloy with lithium, Ni is not a metallic negative electrode active material.

The first negative electrode active material layer 22 includes one type of negative electrode active material from among these negative electrode active materials or a mixture of a plurality of different negative electrode active materials. For example, the first negative electrode active material layer 22 contains only amorphous carbon, or one or more selected from the group consisting of gold (Au), platinum (Pt), palladium (Pd), silicon (Si), silver (Ag), aluminum (Al), bismuth (Bi), tin (Sn), and zinc (Zn). In an embodiment, the first negative electrode active material layer 22 may include a mixture including amorphous carbon and one or more selected from the group consisting of gold (Au), platinum (Pt), palladium (Pd), silicon (Si), silver (Ag), aluminum (Al), bismuth (Bi), tin (Sn), and zinc (Zn). The mixing ratio of a mixture of amorphous carbon and gold or the like may be a weight ratio, and may be, for example, 10:1 to 1:2, 5:1 to 1:1, or 4:1 to 2:1, and is not necessarily limited thereto. The mixing ratio may vary depending on required characteristics of the all solid secondary battery 1. In the case where the negative electrode active material has these composition ratios, the cycle characteristics of the all solid secondary battery 1 are further improved.

The negative electrode active material included in the first negative electrode active material layer 22 may include, for example, a mixture of first particles consisting of amorphous carbon and second particles consisting of metal or metalloid. Metal or metalloid may include, for example, gold (Au), platinum (Pt), palladium (Pd), silicon (Si), silver (Ag), aluminum (Al), bismuth (Bi), tin (Sn), and zinc (Zn). A metalloid may be a semiconductor. The amount of the second particles may be 8 wt % to 60 wt %, 10 wt % to 50 wt %, 15 wt % to 40 wt %, or 20 wt % to 30 wt %, based on the total weight of the mixture. In the case where the second particles have these ranges of amounts, for example, the cycle characteristics of the all solid secondary battery 1 may be further improved.

[Negative Electrode Layer: Binder]

The binders included in the first negative electrode active material layer 22 may be, for example, styrene-butadiene rubber (SBR), polytetrafluoroethylene, polyvinylidene fluoride, polyethylene, a vinylidene fluoride/hexafluoropropylene copolymer, polyacrylonitrile, polymethyl methacrylate, etc., but is not limited thereto. The binder may be any material that is used as a binder in the art. The binder may consist of a single binder or a plurality of different binders.

In the case where the first negative electrode active material layer 22 includes a binder, the first negative electrode active material layer 22 is stabilized on the negative electrode current collector 21. In addition, despite a volume change and/or a change in relative position of the first negative electrode active material layer 22 during the charging and discharging process, the cracking of the first negative electrode active material layer 22 is suppressed. For example, in the case where the first negative electrode active material layer 22 does not contain a binder, the first negative electrode active material layer 22 may be easily separated from the negative electrode current collector 21. On a portion of the negative electrode current collector 21 exposed due to the separation of the first negative electrode active material layer 22 from the negative electrode current collector 21, the negative electrode current collector 21 contacts the solid electrolyte layer 30, which may increase the likelihood of a short circuit. The first negative electrode active material layer 22 is manufactured by applying a slurry in which materials constituting the first negative electrode active material layer 22 are dispersed onto the negative electrode current collector 21 and drying the same. Due to the inclusion of the binder in the first negative electrode active material layer 22, the negative electrode active material may be stably dispersed in the slurry. For example, in the case where the slurry is applied on the negative electrode current collector 21 by the screen printing method, the clogging of the screen (for example, clogging by aggregates of the negative electrode active material) may be prevented.

[Negative Electrode Layer: Other Additives]

The first negative electrode active material layer 22 may further include additives used in the conventional all solid secondary battery 1, for example, fillers, coating agents, dispersants, and ion conductivity auxiliary agents.

[Negative Electrode Layer: First Negative Electrode Active Material Layer]

The thickness of the first negative electrode active material layer 22 may be, for example, less than 50%, less than 40%, less than 30%, less than 20%, less than 10%, or less than 5% of the thickness of the positive electrode active material layer 12. The thickness of the first negative electrode active material layer 22 may be, for example, 1 μm to 20 μm, 2 μm to 10 μm, or 3 μm to 7 μm. In the case where the thickness of the first negative electrode active material layer 22 is too small, lithium dendrites formed between the first negative electrode active material layer 22 and the negative electrode current collector 21 may collapse the first negative electrode active material layer 22, so that the cycle characteristics of the all solid secondary battery 1 may not be increased. In the case where the thickness of the first negative electrode active material layer 22 is too great, the energy density of all solid secondary battery 1 is decreased and the internal resistance of all solid secondary battery 1 by the first negative electrode active material layer 22 is increased, so that the cycle characteristics of the all solid secondary battery 1 may not be increased.

In the case where the thickness of the first negative electrode active material layer 22 is decreased, the charging capacity of the first negative electrode active material layer 22 may be decreased accordingly. The charge capacity of the first negative electrode active material layer 22 may be, for example, 50% or less, 40% or less, 30% or less, 20% or less, 10% or less, 5% or less, or 2% or less, of the charge capacity of the positive electrode active material layer 12. The charge capacity of the first negative electrode active material layer 22 may be, for example, 0.1% to 50%, 0.1% to 40%, 0.1% to 30%, 0.1% to 20%, 0.1% to 10%, 0.1% to 5%, or 0.1% to 2%, of the charge capacity of the positive electrode active material layer 12. In the case where the charge capacity of the first negative electrode active material layer 22 is too small, the thickness of the first negative electrode active material layer 22 is too small that lithium dendrites formed between the first negative electrode active material layer 22 and the negative electrode current collector 21 during repeated charging and discharging processes may collapse the first negative electrode active material layer 22 and thus, the cycle characteristics of all solid secondary battery 1 may not be increased. In the case where the charge capacity of the first negative electrode active material layer 22 is too great, the energy density of all solid secondary battery 1 is decreased and the internal resistance of all solid secondary battery 1 by the first negative electrode active material layer 22 is increased, so that the cycle characteristics of the all solid secondary battery 1 may not be increased.

The charge capacity of the positive electrode active material layer 12 is obtained by multiplying the mass of the positive electrode active material in the positive electrode active material layer 12 by the charge capacity density (mAh/g) of the positive electrode active material. In the case where various types of positive electrode active materials are used, for each positive electrode active material, the charge capacity density needs to be multiplied by mass value, and the sum of these obtained values is the charge capacity of the positive electrode active material layer 12. The charge capacity of the first negative electrode active material layer 22 is calculated in the same way. That is, the charge capacity of the first negative electrode active material layer 22 may obtained by multiplying the charge capacity density (mAh/g) of the negative electrode active material by the mass of the negative electrode active material in the first negative electrode active material layer 22. In the case where various types of negative electrode active materials are used, for each negative electrode active material, the charge capacity density needs to be multiplied by mass value, and the sum of these obtained values is the capacity of the first negative electrode active material layer 22. Herein, the charge capacity densities of the positive electrode active material and the negative electrode active material are capacities estimated using an all-solid half-cell using lithium metal as a counter electrode. The charge capacity of each of the positive electrode active material layer 12 and the first negative electrode active material layer 22 is directly measured by the charge capacity measurement using an all-solid half-cell. In the case where the measured charge capacity is divided by the mass of each active material, the charge capacity density is obtained. Alternatively, the charge capacities of the positive electrode active material layer 12 and the first negative electrode active material layer 22 may be initial charge capacities measured during the first cycle charge.

[Negative Electrode Layer: Second Negative Electrode Active Material Layer]

Although not shown in the drawing, the all solid secondary battery 1 may further include, by charging, a second negative electrode active material layer disposed between the for example negative electrode current collector 21 and the first negative electrode active material layer 22. The second negative electrode active material layer is a metal layer including lithium or a lithium alloy. The metal layer may include lithium or lithium alloy. Since the second negative electrode active material layer is a metal layer containing lithium, the second negative electrode active material layer may act as, for example, a lithium reservoir. Lithium alloy may be, for example, Li—Al alloy, Li—Sn alloy, Li—In alloy, Li—Ag alloy, Li—Au alloy, Li—Zn alloy, Li—Ge alloy, Li—Si alloy, etc., and is not limited thereto. The lithium alloy may be any material that is used as a lithium alloys in the art. The second negative electrode active material layer may consist of one of these alloys or lithium, or several types of alloys. The second negative electrode active material layer may be a plated layer. In an embodiment, the second negative electrode active material layer may be plated between the first negative electrode active material layer 22 and the negative electrode current collector 21 during the charging process of the all solid secondary battery 1.

The thickness of the second negative electrode active material layer is not limited, and may be, for example, 1 μm to 1000 μm, 1 μm to 500 μm, 1 μm to 200 μm, 1 μm to 150 μm, 1 μm to 100 μm, or 1 μm to 50 μm. In the case where the thickness of the second negative electrode active material layer is too small, it is difficult for the second negative electrode active material layer to act as a lithium reservoir. In the case where the thickness of the second negative electrode active material layer is too large, the mass and volume of all solid secondary battery 1 may be increased and the cycle characteristics may rather deteriorate. The second negative electrode active material layer may be, for example, a metal foil with these thickness ranges.

Regarding the all solid secondary battery 1, in an embodiment, the second negative electrode active material layer may be placed between the negative electrode current collector 21 and the first negative electrode active material layer 22 before assembly of the all solid secondary battery 1, or in an embodiment, the second negative electrode active material layer may be plated between the negative electrode current collector 21 and the first negative electrode active material layer 22 by charging after the assembly of the all solid secondary battery 1. In the case where the second negative electrode active material layer is placed between the negative electrode current collector 21 and the first negative electrode active material layer 22 before assembly of the all solid secondary battery 1, since the second negative electrode active material layer is a metal layer containing lithium, the second negative electrode active material layer may act as a lithium reservoir. For example, a lithium foil is placed between the negative electrode current collector 21 and the first negative electrode active material layer 22 before the assembly of the all solid secondary battery 1. As a result, the cycle characteristics of the all solid secondary battery 1 including the second negative electrode active material layer are further improved. In the case where the second negative electrode active material layer is plated by charging after the assembly of the all solid secondary battery 1, since the second negative electrode active material layer is not included during the assembly of the all solid secondary battery 1, the energy density of the all solid secondary battery 1 is increased. For example, when the all solid secondary battery 1 is charged, the charging is performed until the capacity exceeds the charge capacity of the first negative electrode active material layer 22. That is, the first negative electrode active material layer 22 is overcharged. At the beginning of charging, lithium is adsorbed on the first negative electrode active material layer 22. The negative electrode active material included in the first negative electrode active material layer 22 forms an alloy or compound with lithium ions transferred from the positive electrode layer 10. In the case where charging is performed until the capacity of the first negative electrode active material layer 22 exceeds, lithium is plated on, for example, the back side of the first negative electrode active material layer 22, that is, between the negative electrode current collector 21 and the first negative electrode active material layer 22, and a metal layer corresponding to the second negative electrode active material layer is formed by the plated lithium. The second negative electrode active material layer is a metal layer mainly consisting of lithium (that is, metallic lithium). This result is obtained since, for example, the negative electrode active material included in the first negative electrode active material layer 22 consists of a material that forms an alloy or compound with lithium. During discharge, lithium in the first negative electrode active material layer 22 and the second negative electrode active material layer, that is, the metal layer, is ionized and moves towards the positive electrode layer 10. Therefore, it is possible to use lithium as the negative electrode active material in the all solid secondary battery 1. In addition, since the first negative electrode active material layer 22 covers the second negative electrode active material layer, the first negative electrode active material layer 22 may act as a protective layer for the second negative electrode active material layer, that is, the metal layer, and may suppress the precipitation growth of lithium dendrite. Therefore, a short circuit and capacity reduction of the all solid secondary battery 1 are suppressed, and as a result, cycle characteristics of the all solid secondary battery 1 are improved. In addition, in the case where the second negative electrode active material layer is disposed by charging after the assembly of the all solid secondary battery 1, the negative electrode current collector 21 and the first negative electrode active material layer 22 and the area therebetween are, for example, Li-free areas in which lithium (Li) is not present in the initial state or post-discharge state of the all solid secondary battery.

[Negative Electrode Layer: Negative Electrode Current Collector]

The negative electrode current collector 21 consists of, for example, a material that does not react with lithium, that is, a material that does not form either an alloy or a compound, together with lithium. The materials constituting the negative electrode current collector 21 are, for example, copper (Cu), Ni coated Cu, stainless steel (SUS), titanium (Ti), iron (Fe), cobalt (Co), and nickel (Ni), etc., and are not limited thereto. The materials may be any material that is used for electrode current collectors in the art. The negative electrode current collector 21 may consist of one of these metals, or an alloy or a coating material of two or more metals. The negative electrode current collector 21 may be, for example, in the form of a plate or foil.

The all solid secondary battery 1 may further include, for example, a thin film containing an element capable of forming an alloy with lithium on the negative electrode current collector 21. A thin film may be disposed between the negative electrode current collector 21 and the first negative electrode active material layer 22. The thin film may include, for example, an element capable of forming an alloy with lithium. Elements capable of forming alloys with lithium are, for example, gold, silver, zinc, tin, indium, silicon, aluminum, bismuth, etc., and are not limited thereto, and the elements may be any element that is capable of forming alloys with lithium in the art. The thin film may consist of one of these metals or an alloy of several metals thereof. In the case where the thin film is disposed on the negative electrode current collector 21, the plating form of the second negative electrode active material layer plated between a thin film and the first negative electrode active material layer 22 is further flattened, and the cycle characteristics of the all solid secondary battery 1 may be further improved.

The thickness of the thin film may be, for example, 1 nm to 800 nm, 10 nm to 700 nm, 50 nm to 600 nm, or 100 nm to 500 nm. In the case where the thickness of the thin film is less than 1 nm, it may be difficult to exhibit the function of the thin film. In the case where the thickness of the thin film is too great, the thin film itself adsorbs lithium and the amount of lithium plated at the negative electrode is decreased, resulting in a decrease in the energy density of the all solid secondary battery 1 and the deterioration of the cycle characteristics of the all solid secondary battery 1. The thin film may be disposed on the negative electrode current collector 21 by, for example, a vacuum deposition method, a sputtering method, a plating method, etc., and the method is not limited thereto, and any method capable of forming a thin film in the art may be used herein.

[All Solid Secondary Battery Structure]

Figure 7:
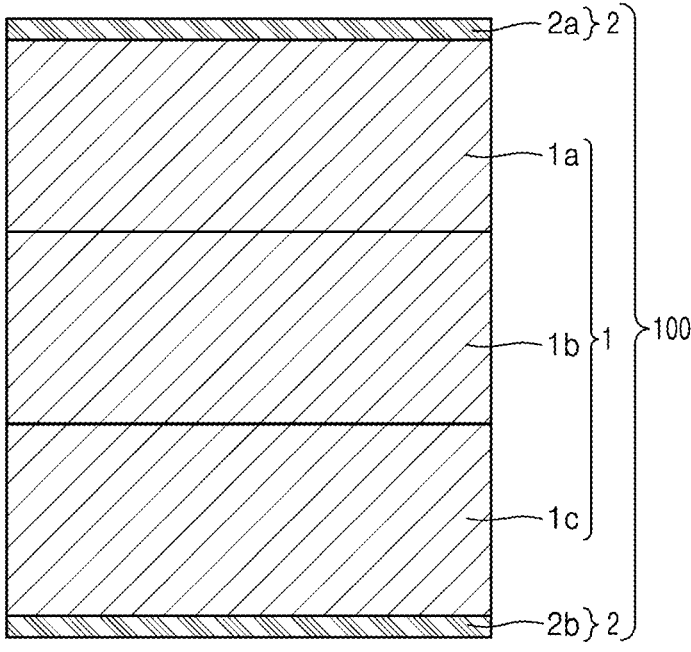
FIG. 7 is a cross-sectional view of an all solid secondary battery structure according to an embodiment.
Figure 8:
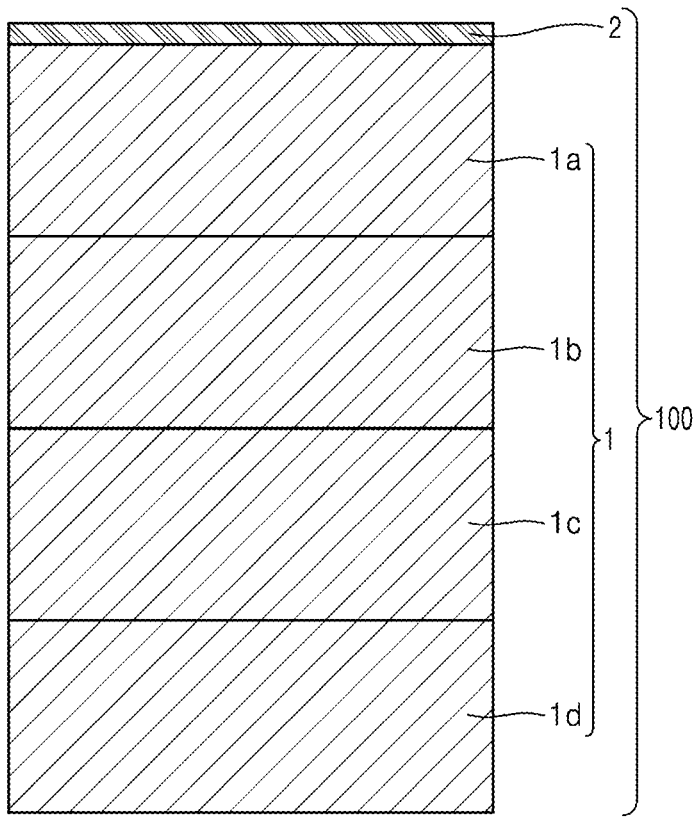
FIG. 8 is a cross-sectional view of an all solid secondary battery structure according to an embodiment.

FIG. 7 is a cross-sectional view of an all solid secondary battery structure according to an embodiment. FIG. 8 is a cross-sectional view of an all solid secondary battery structure according to an embodiment.

An all solid secondary battery structure 100 includes: an all solid secondary battery stack including a plurality of all solid secondary batteries 1*a*, 1*b*, 1*c*, and 1*d* stacked in one direction; and end plates 2, 2*a*, and 2*b* disposed on one surface or opposite surfaces of the all solid secondary battery stack.

In the all solid secondary battery structure 100, a separate cushioning member may be disposed on one surface or opposite surfaces of one or more of the all solid secondary batteries 1*a*, 1*b*, 1*c*, and 1*d* from among a plurality of all solid secondary batteries 1*a*, 1*b*, 1*c*, and 1*d*.

Since the exterior casing material 60 of all solid secondary battery 1 acts as a cushioning member, a separate cushioning member may not be disposed. Therefore, the energy density of the all solid secondary battery structure 100 may be improved.

In the case where an end plate is disposed on one surface or opposite surfaces of the all solid secondary battery structure 100, a constant pressure may be applied to the all solid secondary battery stack. Therefore, an increase in the internal resistance of the all solid secondary battery structure 100 may be suppressed, and cycle characteristics of all solid secondary battery structures may be improved.

[Manufacture of all Solid Secondary Batteries]

(Manufacture of Negative Electrode Layer)

The negative electrode layer may be prepared by, for example, the following method. Negative electrode slurry is prepared by mixing an negative electrode active material, a conductive material, a binder, and a solvent. A negative electrode layer is prepared by coating and drying the negative electrode slurry on the negative electrode current collector. The solvent used in preparing the negative electrode slurry is not limited, and any solvent used in the negative electrode slurry in the art may be used herein. The solvent used for the negative electrode slurry may be, for example, NMP. The types and amounts of the negative electrode current collector, the negative electrode active material, the conductive material, and the binder are the same as described in connection with the negative electrode layer.

In an embodiment, the negative electrode slurry may be coated, along a machine direction (MD), on the center of the negative electrode current collector supplied in the form of a reel. The negative electrode slurry may not be coated on a portion adjacent to opposite ends of the negative electrode current collector and is maintained as a non-coated portion. The negative electrode slurry coated on the negative electrode current collector is dried, and then, roll-pressed to manufacture a negative electrode layer.

(Manufacture of Solid Electrolyte Layer)

The solid electrolyte layer may be prepared by coating the solid electrolyte slurry and then drying the same.

An example of preparing the solid electrolyte slurry will be described now. A solid electrolyte slurry is prepared by mixing a sulfide-based solid electrolyte, a binder, and a solvent. The sulfide-based solid electrolyte and the binder are the same as described in connection with the solid electrolyte layer. The binder may be the same as or different from the binder used in the dry process. The binder included in the solid electrolyte layer may be, for example, styrene butadiene rubber (SBR), polytetrafluoroethylene, polyvinylidene fluoride, polyethylene, etc., but is not limited thereto. The binder may be any material that is used as a binder in the art. The solvent is not particularly limited and may be any solvent that does not react with the sulfide-based solid electrolyte and dissolves the binder. The solvent may be, for example, octyl acetate. The types and amounts of the solid electrolyte and the binder are the same as described in connection with the solid electrolyte layer.

(Manufacture of Positive Electrode Layer)

The positive electrode layer may be prepared by, for example, the following method. Positive electrode slurry is prepared by mixing a positive electrode active material, a sulfide-based solid electrolyte, a conductive material, a binder, and a solvent. A positive electrode layer may be prepared by coating and then drying the positive electrode slurry on one or opposite surfaces of the positive electrode current collector. The solvent used in preparing the positive electrode slurry is not limited, and any solvent used in the positive electrode slurry in the art may be used herein. The solvent used for the positive electrode slurry may be, for example, para-xylene. The types and amounts of the positive electrode current collector, the positive electrode active material, the conductive material, and the binder may be the same as described in connection with the positive electrode layer. A portion of the positive electrode current collector is maintained as a non-coated portion, and is cut to a certain size by notching according to the required battery specifications.

(Manufacture of all Solid Secondary Battery)

Figure 9:
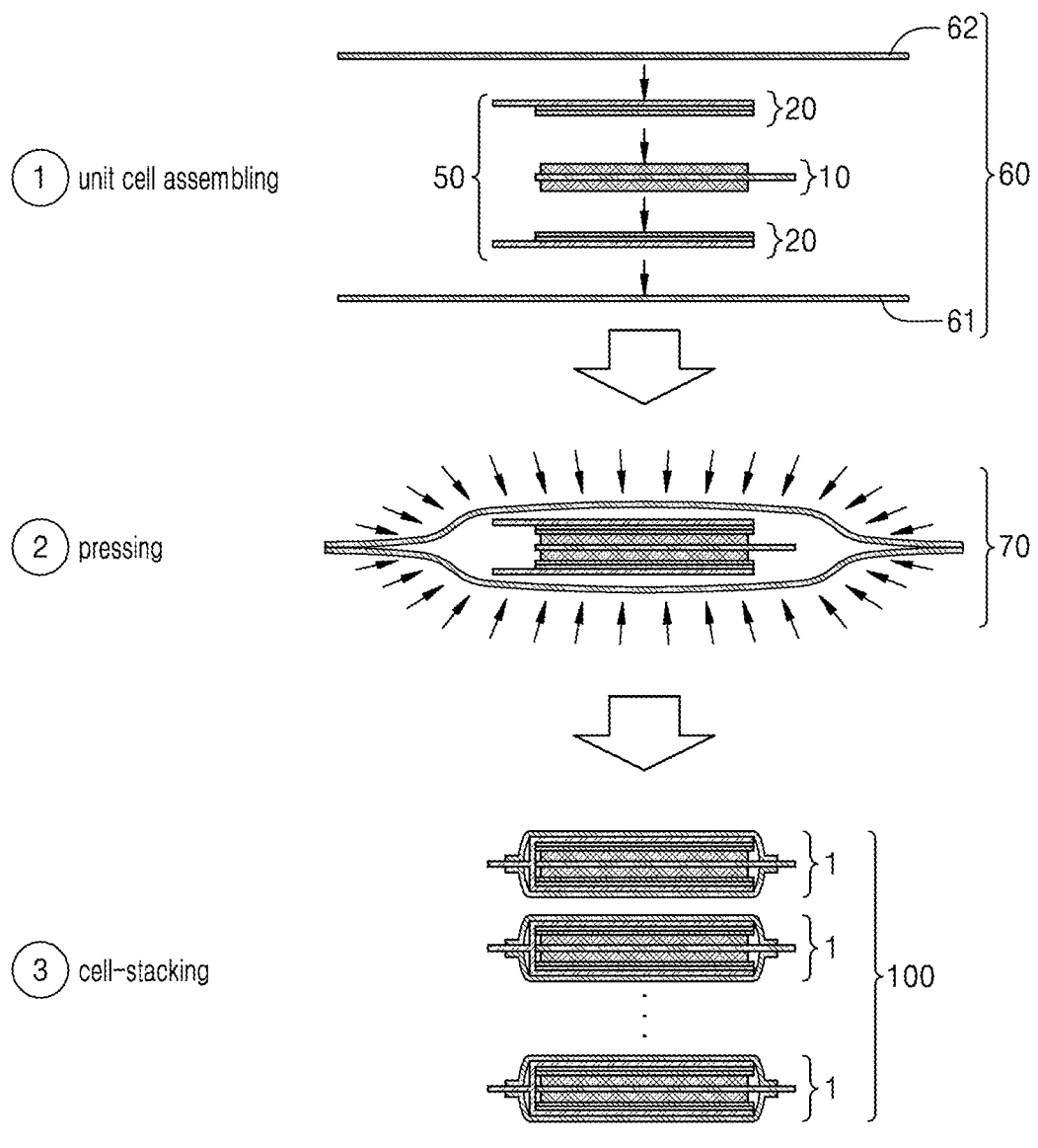
FIG. 9 is a schematic diagram of a method of manufacturing an all solid secondary battery according to an embodiment.
Figure 10:
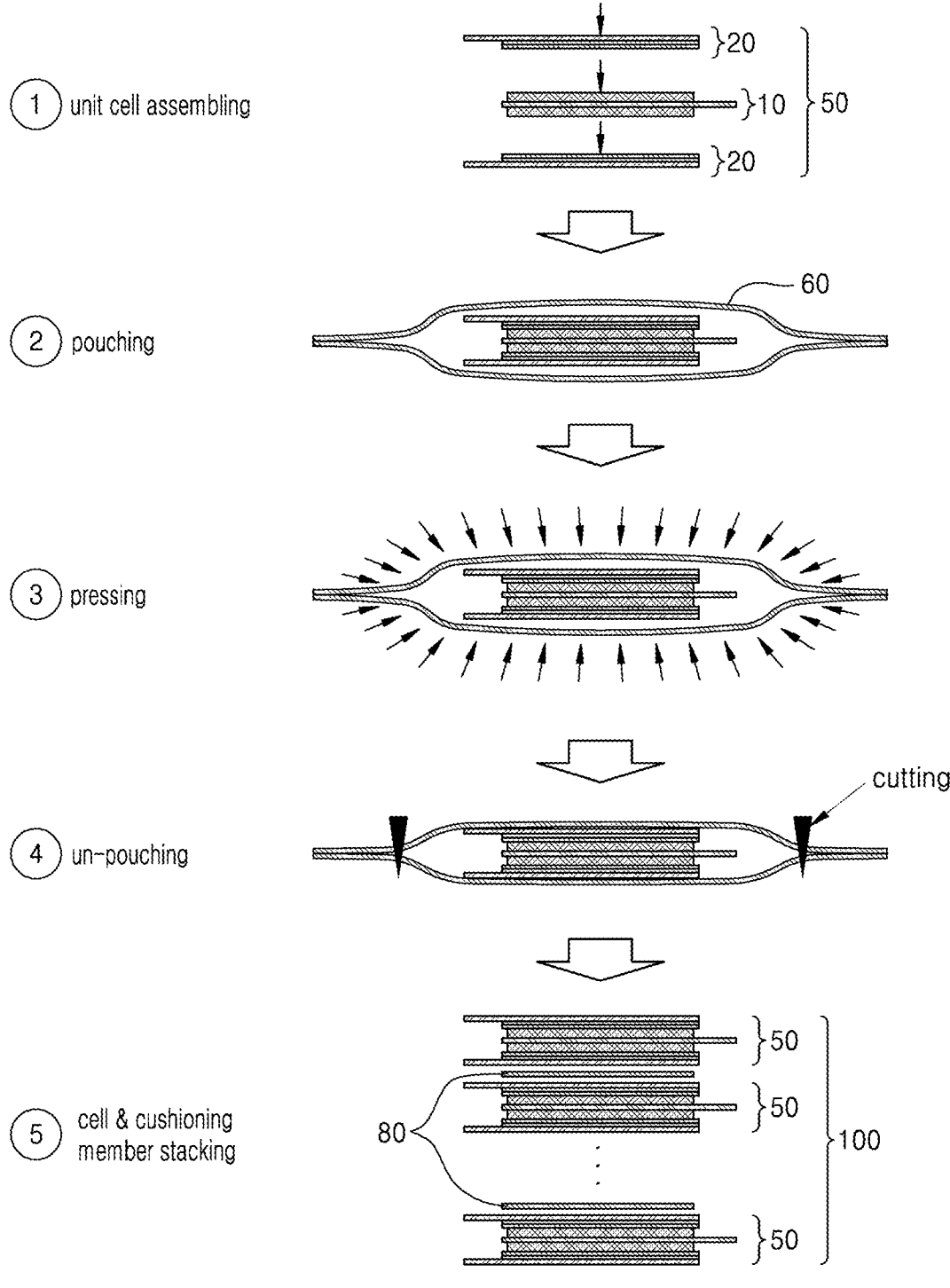
FIG. 10 is a schematic diagram of a method of manufacturing an all solid secondary battery of the related art.

FIG. 9 is a schematic diagram of a method of manufacturing an all solid secondary battery according to an embodiment. FIG. 10 is a schematic diagram of a method of manufacturing an all solid secondary battery of the related art.

A method of manufacturing an all solid secondary battery method includes: providing an assembly 70; and preparing a sealed assembly 70 by pressing and sealing the assembly 70, wherein the assembly 70 includes: a stack 50 including a positive electrode layer 10, a negative electrode layer 20, and a solid electrolyte layer 30 disposed between the positive electrode layer 10 and the negative electrode layer 20; and an exterior casing material 60 for accommodating and sealing the stack 50, wherein the exterior casing material 60 includes a first exterior casing material 61 disposed on a first surface of the stack 50 adjacent to the negative electrode layer 20, and a second exterior casing material 62 disposed on a second surface of the stack 50 opposing the first surface, wherein the positive electrode layer 10 includes a positive electrode current collector 11 and a positive electrode active material layer 12 disposed on one surface or opposite surfaces of the positive electrode current collector 11, the negative electrode layer 20 includes a negative electrode current collector 21 and a first negative electrode active material layer 22 disposed on the negative electrode current collector 21, the first negative electrode active material layer 22 may not include a solid electrolyte, or the amount of the solid electrolyte included in the first negative electrode active material layer 22 is 3 wt % or less of the total weight of the first negative electrode active material layer 22, and the first exterior casing material 61 includes a cushioning layer.

Referring to FIG. 9, a method of manufacturing an all solid secondary battery may include: providing an assembly 70; and preparing a sealed assembly 70 by pressing and sealing the assembly 70.

First, the assembly 70 includes: a stack 50 including a positive electrode layer 10, a negative electrode layer 20, and a solid electrolyte layer 30 disposed between the positive electrode layer 10 and the negative electrode layer 20; and an exterior casing material 60 for accommodating and sealing the stack 50. The exterior casing material 60 includes a first exterior casing material 61 disposed on a first surface of the stack 50 adjacent to the negative electrode layer 20, and a second exterior casing material 62 disposed on a second surface of the stack 50 opposing the first surface. The assembly 70 is not yet sealed. The order in which the components of the assembly 70 are arranged, is not particularly limited. For example, the stack 50 is provided, and the first exterior casing material 61 and the second exterior casing material 62 may be disposed on one side and another side of the stack 50, respectively. Alternatively, the stack 50 may be disposed on one of the first exterior casing material 61 and the second exterior casing material 62, and the other one thereof may be disposed on the stack 50.

The assembly 70 is then sealed. Sealing may be performed by adhesive or thermal fusion, but the sealing method is not necessarily limited thereto, and any sealing method used in the art may be used herein. Sealing may be performed in an inert atmosphere. Sealing may be performed under atmospheric pressure or in a vacuum atmosphere.

Then, the sealed assembly 70 is pressed. The pressing method is not particularly limited, and any pressing method used in the art may be used herein. Pressing may be, for example, warm istactic press (WIP), hot istactic press (HIP), cold istactic press (CIP), plate pressing, roll pressing, or the like.

The pressure at the time of pressing may be 100 MPa to 600 MPa, 150 MPa to 600 MPa, 200 MPa to 600 MPa, 250 MPa to 600 MPa, 300 MPa to 600 MPa, or 400 MPa to 600 MPa. The solid electrolyte may be effectively sintered in the case where the pressure at the time of pressing is 100 MPa or more. In the case where the pressure at the time of pressing is too low, the internal resistance of the all solid secondary battery may be increased and thus, cycle characteristics of the all solid secondary battery may be decreased.

Subsequently, the sealed and pressed assembly 70 may be stacked. The sealed and pressed assembly 70 may be a unit cell of the all solid secondary battery 1. The sealed and pressed assembly 70 is stacked to prepare an all solid secondary battery 1.

The stacking of the sealed and pressed assembly 70 may be performed at atmospheric pressure and in an air atmosphere. Therefore, the stack of the all solid secondary battery 1 may be easily manufactured.

In contrast, referring to FIG. 10, according to a conventional method of manufacturing an all solid secondary battery 1, a stack 50 including a positive electrode layer 10, a negative electrode layer 20, and a solid electrolyte layer 30 disposed between the positive electrode layer 10 and the negative electrode layer 20, is prepared, and then, for pressing, sealing is performed using an exterior casing material, and after pressing, the exterior casing material is removed, and then, a cushioning member 80 is disposed between a plurality of pressed stacks 50. As such, the manufacturing process is complicated and the exterior casing material is consumed excessively. In addition, since the process of disposing the cushioning member 80 between the plurality of pressed stacks 50 needs to be performed in an atmosphere where moisture and oxygen are blocked, the manufacturing process is complicated and the manufacturing costs are high. Although not shown in the drawing, an assembly is prepared by placing the cushioning member 80 between a plurality of pressed stacks 50, and then the assembly is accommodated in an exterior casing material to manufacture an all solid secondary battery.

MODE OF DISCLOSURE

The present creative concept will be described in detail using Examples and Comparative Examples. However, Examples are provided only for illustrative purposes, and do not limit the scope of the creative concept.
(Manufacture of Cushioning Exterior Casing Material Sheet)

Preparation Example 1

0.3 parts by weight of an isocyanate-based crosslinking agent (Coronate L) and 3 parts by weight of Expancel 551 DU 40 (Expancel 551 DU 40) were mixed with 100 parts by weight of a solvent acrylate mixed resin having a molecular weight of 1 million Daltons, and then dried at 150° C. for 5 minutes to obtain an exterior casing material sheet.

Preparation Example 2

0.1 parts by weight of photoinitiator, 0.1 parts by weight of a diacrylic crosslinking agent, and 3 parts by weight of Expancel 551 DU 40 were mixed with 100 parts by weight of a solventless acrylate mixed resin of a molecular weight of 1 million Dalton, and then cured by ultraviolet (UV) light for 5 minutes, and dried for 5 minutes at 150° C. to prepare the exterior casing material steel.

Preparation Example 3

Carbon dioxide gas was supplied to a mixture of propylene-based polyol having a molecular weight of 4000 Dalton, trifunctional castor oil-based polyol, and isocyanate for 10 minutes while stirring to perform a curing process at 120° C. for 5 minutes to prepare an exterior casing material sheet.

Preparation Example 4

An exterior casing material sheet was prepared by placing an adhesive layer between a 10 μm-thick acrylic cushioning sheet and a 100 μm-thick silicone cushioning sheet and stacked to prepare an exterior casing material sheet. The adhesive layer had properties for blocking moisture and gas.

Preparation Example 5

An aluminum laminate sheet with a thickness of 300 μm was used as the second exterior casing material.

The aluminum laminate sheet had a structure in which a polyethylene terephthalate sheet, an aluminum sheet, and a polyethylene terephthalate sheet were stacked in this order at a thickness ratio of 3.5:3:3.5. An adhesive layer with a thickness of 5 μm was disposed among sheets.

Comparative Preparation Example 1

A silicone rubber sheet having a thickness of 300 μm was prepared as an exterior casing material sheet.

Comparative Preparation Example 2

A polytetrafluoroethylene (PTFE) sheet having a thickness of 300 μm was prepared as an exterior casing material sheet.

Comparative Preparation Example 3

A polyurethane sheet having a thickness of 300 μm was prepared as an exterior casing material sheet.

Comparative Preparation Example 4

An acrylic adhesive sheet having a thickness of 300 μm was prepared as an exterior casing material sheet.
(Manufacture of all Solid Secondary Batteries)

Example 1: Mono-Cell all Solid Secondary Battery (Manufacture of Negative Electrode Layer)

As a current collector for the negative electrode, a SUS sheet having a thickness of 10 μm was prepared. As negative electrode active materials, carbon black (CB) having a primary particle diameter of about 30 nm and silver (Ag) particles having an average particle diameter of about 60 nm were prepared.

4 g of mixed powder, which is a mixture of carbon black (CB) and silver (Ag) particles in a weight ratio of 3:1, was placed in a container, and 4 g of NMP solution containing 7 wt % of PVDF binder (#9300 from Kureha) was added thereto to prepare a mixed solution. A slurry was prepared by stirring the mixed solution while gradually adding NMP to the prepared mixed solution. The prepared slurry was applied to a SUS sheet using a bar coater, and dried in air at 80° C. for 10 minutes to prepare a stack. The obtained stack was vacuum dried at 40° ° C. for 10 hours. The dried stack was cold-roll-pressed at a pressure of 490 MPa to flatten the surface of the first negative electrode active material layer of the stack. As such, a negative electrode layer was produced.

The thickness of the first negative electrode active material layer included in the negative electrode layer was about 7 μm.

(Manufacture of Positive Electrode Layer)

As a positive electrode active material, $Li_2O$—$ZrO_2$ (LZO)-coated $LiNi_{0.8}Co_{0.15}Mn_{0.05}O_2$ (NCM) was prepared. The LZO-coated positive electrode active material was prepared according to the method disclosed in Korean Patent Publication No. 10-2016-0064942. As a solid electrolyte, Argyrodite (Argyrodite) type crystalline $Li_6PS_5Cl$ (D50=0.5 μm, crystalline) was prepared. As a binder, a polytetrafluoroethylene (PTFE) binder (DuPont Teflon binder) was prepared. Carbon nanofibers (CNF) were prepared as a conductive material. These materials were mixed in a weight ratio of positive electrode active material:solid electrolyte: conductive agent:binder=84:11.5:3:1.5, together with a xylene solvent, and the mixture was molded into a sheet form, and vacuum dried at 40° C. for 8 hours to prepare a positive electrode sheet. A positive electrode sheet was placed on one surface of a positive electrode current collector consisting of aluminum foil on one surface of which carbon was coated, and a heated roll pressing was performed thereon at 85° C. under a pressure of 5 ton f/cm² to prepare a positive electrode layer. The thickness of the positive electrode layer was about 120 μm. The thickness of the positive electrode active material layer was about 96 μm, and the thickness of the carbon-coated aluminum foil was about 24 μm.

(Manufacture of Solid Electrolyte Layer)

A mixture was prepared by adding 1.5 parts by weight of an acrylic binder based on 98.5 parts by weight of a solid electrolyte to a $Li_6PS_5Cl$ solid electrolyte (D50=3.0 μm, crystalline), which is an argyrodite type crystal. A slurry was prepared by stirring while adding octyl acetate to the prepared mixture. The prepared slurry was applied on a 15 μm thick nonwoven fabric placed on a 75 μm thick PET substrate using a bar coater, and dried in air at 80° C. for 10 minutes to obtain a stack. The obtained stack was vacuum dried at 80° C. for 2 hours. As such, a solid electrolyte layer was prepared.

(Flame Retardant Inactive Member)

A slurry containing pulp fiber, glass fiber, aluminum hydroxide $(Al(OH)_3)$, an acrylic binder, and a solvent was molded into a certain shape, and then the solvent was removed therefrom to prepare a flame retardant inactive member.

The weight ratio of cellulose fiber, glass fiber, aluminum hydroxide $(Al(OH)_3)$, and an acrylic binder was 20:8:70:2. The prepared flame retardant member was left at room temperature for 1 week and then used.

The flame retardant inactive member was subjected to vacuum heat treatment at 80° C. for 5 hours before application to an all solid secondary battery to remove moisture from the an inactive member.

(Manufacture of First Exterior Casing Material)

The cushioning sheet prepared according to in Preparation Example 1 was placed on a polyethylene terephthalate sheet, and used as a first exterior casing material. The polyethylene terephthalate sheet was used as the protective layer, and the cushioning sheet was used as the cushioning layer.

(Manufacture of the Second Exterior Casing Material)

The aluminum laminate sheet prepared according to Preparation Example 5 was used as a second exterior casing material.

(Manufacture of all Solid Secondary Batteries)

Referring to FIGS. 1 and 2, the solid electrolyte layer was arranged on the negative electrode layer such that the first negative electrode active material layer contacted the solid electrolyte layer. A flame retardant inactive member was disposed on the solid electrolyte layer by heat pressing to prepare a first stack of negative electrode layer/solid electrolyte layer/inactive member.

The inactive member was arranged on one side of the positive electrode layer to face the positive electrode active material layer to prepare a second stack of negative electrode layer/solid electrolyte layer/positive electrode layer. The inactive member was arranged such that the inactive member contacted the solid electrolyte layer while surrounding the side of the positive electrode layer around the positive electrode layer. A gasket was used as the inactive member. The positive electrode layer was placed in the center of the solid electrolyte layer, and a gasket surrounded the positive electrode layer and extended to the end of the solid electrolyte layer. The area of the positive electrode layer was about 95% of the area of the solid electrolyte layer, and the inactive member was placed on the remaining 5% of the area of the solid electrolyte layer where the positive electrode layer was not placed. A solid electrolyte layer was placed on the positive electrode layer and the inactive member, and a negative electrode layer was placed on the solid electrolyte layer.

A first exterior casing material was disposed on the first surface of the second stack adjacent to the negative electrode layer and a second exterior casing material was disposed on the second surface of the second stack adjacent to the positive electrode layer, to prepare a third stack. An adhesive was placed along the edge of portions of the first exterior casing material and the second exterior casing material where the first exterior casing material and the second exterior casing material were adjacent to each other, and then vacuum sealed. The sealed third stack of first exterior casing material/negative electrode layer/solid electrolyte layer/positive electrode layer/second exterior casing material was treated with warm istactic press (WIP) at 85° C. and a pressure of 500 MPa for 30 minutes. By this pressing process, the solid electrolyte layer was sintered and battery characteristics were improved. The thickness of one sintered solid electrolyte layer was about 45 μm. The sintered electrode assembly was used as a unit cell as it was. A portion of the positive electrode current collector and a portion of the negative electrode current collector were allowed to protrude out of the sealed unit cell and used as a positive electrode layer terminal and a negative electrode layer terminal, respectively. A cushioning layer of the first exterior casing material was placed on the negative electrode layer.

Example 2: Bi-Cell all Solid Secondary Battery (Manufacture of Negative Electrode Layer)

A negative electrode layer was prepared in the same way as in Example 1. Two negative electrode layers were prepared.

(Manufacture of Positive Electrode Layer)

A positive electrode layer was manufactured in the same manner as in Example 1, except that positive electrode active materials were formed on opposite surfaces of the positive electrode current collector, respectively.

The total thickness of the positive electrode layer was about 220 μm. The thickness of each of the positive electrode active material layers were about 96 μm, and the thickness of the carbon-coated aluminum foil was about 24 μm.

(Manufacture of Solid Electrolyte Layer)

A solid electrolyte layer was prepared in the same manner as in Example 1. Two solid electrolyte layers were prepared.

(Flame Retardant Inactive Member)

A flame retardant inactive member was prepared in the same manner as in Example 1.

(Manufacture of First Exterior Casing Material)

The cushioning sheet prepared according to in Preparation Example 1 was placed on a polyethylene terephthalate sheet, and used as a first exterior casing material. The polyethylene terephthalate sheet was used as the protective layer, and the cushioning sheet was used as the cushioning layer.

(Manufacture of the Second Exterior Casing Material)

The aluminum laminate sheet prepared according to Preparation Example 5 was used as a second exterior casing material.

(Manufacture of all Solid Secondary Batteries)

Referring to FIGS. 3 and 4, a first stack was manufactured in the same manner as in Example 1. Two first stacks were prepared.

The first stacks were respectively arranged on opposite surfaces of the positive electrode layer such that the inactive member of the first stack surrounded the side surface of the positive electrode layer, and the solid electrolyte layer of the first stack contacted the positive electrode layer, thereby preparing a second stack.

The inactive member was arranged such that the inactive member contacted the solid electrolyte layer while surrounding the side of the positive electrode layer around the positive electrode layer. A gasket was used as the inactive member. The positive electrode layer was placed in the center of the solid electrolyte layer, and a gasket surrounded the positive electrode layer and extended to the end of the solid electrolyte layer. The area of the positive electrode layer was about 95% of the area of the solid electrolyte layer, and the inactive member was placed on the remaining 5% of the area of the solid electrolyte layer where the positive electrode layer was not placed. A solid electrolyte layer was placed on the positive electrode layer and the inactive member, and a negative electrode layer was placed on the solid electrolyte layer.

A first exterior casing material and a second exterior casing material were respectively disposed on the two first surfaces adjacent to the negative electrode layer of the second stack, thereby preparing a third stack. An adhesive was placed along the edge of portions of the first exterior casing material and the second exterior casing material where the first exterior casing material and the second exterior casing material were adjacent to each other, and then vacuum sealed. The sealed third stack of first exterior casing material/negative electrode layer/solid electrolyte layer/positive electrode layer/second exterior casing material was treated with warm istactic press (WIP) at 85° C. and a pressure of 500 MPa for 30 minutes. By this pressing process, the solid electrolyte layer was sintered and battery characteristics were improved. The thickness of one sintered solid electrolyte layer was about 45 μm. The sintered stack was used as a unit cell as it was. A portion of the positive electrode current collector and a portion of the negative electrode current collector were allowed to protrude out of the sealed unit cell and used as a positive electrode layer terminal and a negative electrode layer terminal, respectively.

A cushioning layer of the first exterior casing material was placed on the negative electrode layer.

Example 3

A bi-cell all solid secondary battery was manufactured in the same manner as used in Example 2, except that the first exterior casing material was used as the cushioning sheet prepared according to Preparation Example 2 on the polyethylene terephthalate sheet, and the aluminum laminate sheet prepared according to Preparation Example 5 was used as the second exterior casing material.

Example 4

A bi-cell all solid secondary battery was manufactured in the same manner as used in Example 2, except that the first exterior casing material was used as the cushioning sheet prepared according to Preparation Example 2 on the polyethylene terephthalate sheet, and the aluminum laminate sheet prepared according to Preparation Example 5 was used as the second exterior casing material.

Example 5

A bi-cell all solid secondary battery was manufactured in the same manner as in Example 2, except that the cushioning sheet manufactured according to Preparation Example 4 was used as the first exterior casing material and the aluminum laminate sheet manufactured according to Preparation Example 5 was used as the second exterior casing material.

Example 6

A bi-cell all solid secondary battery was manufactured in the same manner as in Example 2, except that the cushioning sheet prepared according to Preparation Example 1 was placed on the polyethylene terephthalate sheet and used as each of the first exterior casing material and the second exterior casing material.

Example 7

A bi-cell all solid secondary battery was manufactured in the same manner as in Example 2, except that the cushioning sheet prepared according to Preparation Example 2 was placed on the polyethylene terephthalate sheet and used as each of the first exterior casing material and the second exterior casing material.

Example 8

A bi-cell all solid secondary battery was manufactured in the same manner as in Example 2, except that the cushioning sheet prepared according to Preparation Example 3 was placed on the polyethylene terephthalate sheet and used as each of the first exterior casing material and the second exterior casing material.

Example 9

A bi-cell all solid secondary battery was manufactured in the same manner as in Example 2, except that the cushioning sheet prepared according to Preparation Example 4 was used as each of the first exterior casing material and the second exterior casing material.

Comparative Example 1

A bi-cell all solid secondary battery was manufactured in the same manner as in Example 2, except that the sheet manufactured according to Comparative Preparation Example 1 was used as the first exterior casing material and the aluminum laminate sheet manufactured according to Preparation Example 5 was used as the second exterior casing material.

Comparative Example 2

A bi-cell all solid secondary battery was manufactured in the same manner as in Example 2, except that the sheet manufactured according to Comparative Preparation Example 2 was used as the first exterior casing material and the aluminum laminate sheet manufactured according to Preparation Example 5 was used as the second exterior casing material.

Comparative Example 3

A bi-cell all solid secondary battery was manufactured in the same manner as in Example 2, except that the sheet manufactured according to Comparative Preparation Example 3 was used as the first exterior casing material and the aluminum laminate sheet manufactured according to Preparation Example 5 was used as the second exterior casing material.

Comparative Example 4

A bi-cell all solid secondary battery was manufactured in the same manner as in Example 2, except that the sheet manufactured according to Comparative Preparation Example 4 was used as the first exterior casing material and the aluminum laminate sheet manufactured according to Preparation Example 5 was used as the second exterior casing material.

Comparative Example 5

A bi-cell all solid secondary battery was manufactured in the same manner as in Example 2, except that the sheet manufactured according to Comparative Preparation Example 1 was used as each of the first exterior casing material and the second exterior casing material.

Comparative Example 6

A bi-cell all solid secondary battery was manufactured in the same manner as in Example 2, except that the sheet manufactured according to Comparative Preparation Example 2 was used as each of the first exterior casing material and the second exterior casing material.

Comparative Example 7

A bi-cell all solid secondary battery was manufactured in the same manner as in Example 2, except that the sheet manufactured according to Comparative Preparation Example 3 was used as each of the first exterior casing material and the second exterior casing material.

Comparative Example 8

A bi-cell all solid secondary battery was manufactured in the same manner as in Example 2, except that the sheet manufactured according to Comparative Preparation Example 4 was used as each of the first exterior casing material and the second exterior casing material.

Comparative Example 9

A bi-cell all solid secondary battery was manufactured in the same manner as in Example 2, except that the aluminum laminate sheet manufactured according to Preparation Example 5 was used as each of the first exterior casing material and the second exterior casing material.

(Manufacture of all Solid Secondary Battery Stack)

Example 10

A plurality of pressed unit cells, each being prepared according to Example 2, were prepared.

A plurality of unit cells were stacked in the thickness direction, end plates were placed on opposite surfaces of the stacked all solid secondary battery, and the end plates were bonded to each other to manufacture an all solid secondary battery stack.

Evaluation Example 1: Measurement of Compression Force Deflection

The exterior casing material sheets manufactured according to Preparation Examples 1 to 4 and Comparative Preparation Examples 1 to 4 were compressed to a thickness of 50% of the original thickness at a compression ratio of 1 mm/min by using a compression tester, and then, the load thereof was obtained, and the following calculation formula was used. The measurement results are shown in Table 1 below. 50% compression force deflection (CFD)=[load at 50% compression]/[area of exterior casing material sheet]

Evaluation Example 2: Measurement of Stress Relaxation Rate

By using a compressive modulus tester, the stress relaxation rate in the thickness direction of each of the exterior casing material sheets manufactured according to Preparation Examples 1 to 4 and Comparative Preparation Examples 1 to 4 was measured. The measurement results are shown in Table 1 below. The stress relaxation rate was measured at a load of 0.5 N.

The measurement was performed at a temperature of 25° C.

A first point was reached by compression of 50% from the initial thickness of the exterior casing material sheet, and a second point was reached by additional compression of 13.33% of the initial thickness to measure the first stress, and 60 seconds later at the second point, the second stress was measured. The thickness reduced by the first compression varied depending on the load.

The stress relaxation rate was calculated from Equation 2 below.

$$\text{Stress relaxation rate} = \left[ (S1 - S2)/S1 \right] \times 100 \qquad \text{Equation 2}$$

wherein SI indicates a first stress measured when a first point is reached by compression by 50% of the initial thickness and then a second point was reached from the first point by additional compression by 13.33% of the initial thickness.

S2 indicates a second stress measured 60 seconds after the time of measuring the first stress.

Evaluation Example 3: Measurement of Compression Recovery Ratio

By using a compressive modulus tester, the compression recovery ratio in the thickness direction of each of the exterior casing material sheets manufactured according to Preparation Examples 1 to 4 and Comparative Preparation Examples 1 to 4 was measured. The measurement results are shown in Table 1 below. The compression recovery ratio was measured at a load of 0.5 N.

The measurement was performed at a temperature of 25° C.

When the exterior casing material sheet was compressed by 50% from the initial thickness to reach the first point, a third stress was measured. Then, from the first point, the compression was additionally performed by 13.33% of the initial thickness to reach the second point. 60 seconds later at the second point, the first point was reached back by relaxation from the second point and a fourth stress was measured. The compression recovery ratio was calculated from Equation 3 below.

$$\text{Compression recovery ratio} = AA2/AA1 \times 100C \qquad \text{Equation 3}$$

wherein AA1 indicates a third stress measured at the first point reached by compression by 50% of the initial thickness, and AA2: a fourth stress measured at the first point after relaxed from the second point, following the arrival at the second point by additional compression by 13.33% compared to the initial thickness at the first point.

Evaluation Example 4: Measurement of Compression Elastic Modulus

By using a compressive modulus tester, the compression elastic modulus in the thickness direction of each of the exterior casing material sheets manufactured according to Preparation Examples 1 to 4 and Comparative Preparation Examples 1 to 4 was measured.

The measurement was performed under conditions of a temperature of 25° C. and a compression rate of 1 N/min.

The compression elastic modulus was obtained from the slope of the stress-strain line having the deformation rate of 0 and 10%. In the compression elastic modulus measurement, the position where the stress developed was set as the deformation rate of 0%.

The compression elastic modulus of the exterior casing material sheet prepared according to Preparation Examples 1 to 4 was 0.1 MPa to 1.0 MPa.

Evaluation Example 5: Deformation Rate Measurement

The deformation rate was measured from the change in thickness of the exterior casing material sheet at a point where the stress reached 10 MPa when the compression elastic modulus was measured in Evaluation Example 4.

The deformation rate of each of the exterior casing material sheets manufactured according to Preparation Examples 1 to 4 were 50% to 90%. The deformation rate may be calculated from Equation 1.

$$\text{Deformation rate} = 100 - (T2/T1) \times 100 \qquad \text{Equation 1}$$

wherein T1 indicates a thickness of the cushioning layer when no stress is applied, and T2 indicates a thickness of the cushioning layer when stress reaches 10 MPa.

TABLE 1

| | Compressive strength [GPa] | Stress relaxation rate [%] | Compression recovery ratio [%] |
|---|---|---|---|
| Preparation Example 1 | 0.36 | 14.7 | 66.5 |
| Preparation Example 2 | 0.38 | 12.9 | 75 |
| Preparation Example 3 | 0.40 | 8 | 84.8 |
| Preparation Example 4 | 0.40 | 12.2 | 71.5 |
| Comparative Preparation Example 1 | 0.80 | 1.5 | 98 |
| Comparative Preparation Example 2 | 0.6 | 10.3 | 71 |
| Comparative Preparation Example 3 | 0.2 | 3.1 | 96 |
| Comparative Preparation Example 4 | 0.15 | 14 | 60 |

Evaluation Example 6: Evaluation of Charge/Discharge Characteristics

The charge and discharge characteristics of the all solid secondary batteries prepared in Examples 2 to 9 and Comparative Examples 1 to 9 were evaluated by the following charge and discharge test. The charge/discharge test of each of the all solid secondary batteries was performed in a constant temperature bath at 45° C.

The all solid secondary batteries were placed in a test module and fixed with a force of 5000 kgf.

In the first cycle, the battery was charged with a constant current of 0.3 C until the battery voltage reached 4.25 V, and once the battery voltage reached 4.25 V, constant voltage charging was performed at 4.25 V under a 0.05 C cut-off condition. Subsequently, discharging was performed at a constant current of 0.3 C until the battery voltage reached 2.5 V.

In the second cycle and more, charging and discharging were performed up to 300 cycles under the same conditions as the first cycle.

Lifespan characteristics are shown in Table 2 below. In Table 2, the capacity retention ratio is shown in Equation 1 below.

$$\text{Capacity retention ratio [\%]} = [\text{discharge capacity in} \qquad \text{Equation 1}$$
$$\text{the } 1^{st}\text{cycle/discharge capacity in the } 300^{th}\text{cycle}] \times 100$$

TABLE 2

| | Capacity retention ratio [%] |
|---|---|
| Example 2 | 90 or more |
| Example 3 | 90 or more |
| Example 4 | 90 or more |
| Example 5 | 90 or more |

TABLE 2-continued

| | Capacity retention ratio [%] |
|---|---|
| Example 6 | 90 or more |
| Example 7 | 90 or more |
| Example 8 | 90 or more |
| Example 9 | 90 or more |
| Comparative Example 1 | — |
| Comparative Example 2 | 88 |
| Comparative Example 3 | — |
| Comparative Example 4 | — |
| Comparative Example 5 | — |
| Comparative Example 6 | 88 |
| Comparative Example 7 | — |
| Comparative Example 8 | — |
| Comparative Example 9 | — |

As shown in Table 2, the all solid secondary batteries of Examples 2 to 9 operated normally up to 300 cycles and had the capacity retention ratio of 90% or more.

The all solid secondary batteries of Comparative Examples 2 and 6 operated normally up to 300 cycles and had the capacity retention ratio of 88%.

The all solid secondary batteries of Comparative Examples 1, 3 to 5, and 7 to 9 had a short circuit before 50 cycles, so that the capacity retention ratio thereof could not be measured.

It was confirmed that since the all solid secondary batteries of Examples 2 to 9 use a cushioning exterior casing material with constant compression force deflection, the structures and manufacturing processes thereof are simplified, a short circuit is prevented, and improved cycle characteristics are provided.

After the first cycle of charging is completed for the all solid secondary batteries of Examples 1 to 9, scanning electron microscope (SEM) images of the cross-sections of these batteries were obtained. From the images, it was confirmed that a lithium metal plated layer corresponding to the second negative electrode active material layer was formed between the first negative electrode active material layer and the negative electrode current collector.

As described above, the all solid state secondary battery according to the present embodiment can be applied to various portable devices or vehicles.

Embodiments have been described in detail with reference to the accompanying drawings, but the present disclosure is not limited to these examples. It is obvious that a person with ordinary knowledge in the technical field to which this creative idea belongs could derive various examples of changes or modifications within the scope of the technical concept described in the claims, and these are within the technical scope of the present creative concept.

EXPLANATION OF REFERENCE NUMERALS DESIGNATING THE MAJOR ELEMENTS OF THE DRAWINGS

1: all solid secondary battery 2: end plate
10: positive electrode layer 11: positive electrode current collector 12: positive electrode active material layer 20: negative electrode layer
21: negative electrode current collector 22: first negative electrode active material layer
30: solid electrolyte layer 40: inactive member
50: stack 60: exterior casing material
70: assembly 80: cushioning pad
100 all solid secondary battery structure

INDUSTRIAL APPLICABILITY

According to one aspect, an all solid secondary battery with a new structure includes a first exterior casing material including a cushioning layer. Accordingly, an all solid secondary battery in which the occurrence of a short circuit is prevented and of which cycle characteristics are improved, can be provided.

According to another aspect, the structure of the all solid secondary battery structure of the new structure is simplified, and the all solid secondary battery structure can be manufactured in a dry room under relaxed conditions or in a general room other than a dry room.

According to a method of manufacturing an all solid secondary battery according to an aspect, an all solid secondary battery can be manufactured by pressing and sealing the assembly and additional steps and members are omitted. Accordingly, the production efficiency of the all solid secondary battery can be increased.

The invention claimed is:

1. An all solid secondary battery, comprising:
a stack including a positive electrode layer, a negative electrode layer, and a solid electrolyte layer disposed between the positive electrode layer and the negative electrode layer; and
an exterior casing material accommodating and sealing the stack,
wherein:
the positive electrode layer includes a positive electrode current collector and a positive electrode active material layer disposed on one surface or opposite surfaces of the positive electrode current collector,
the negative electrode layer includes a negative electrode current collector and a first negative electrode active material layer disposed on the negative electrode current collector,
the first negative electrode active material layer does not contain a solid electrolyte or an amount of the solid electrolyte contained in the first negative electrode active material layer is 3 wt % or less of the total weight of the first negative electrode active material layer;
the exterior casing material includes:
a first exterior casing material disposed on a first surface of the stack adjacent to the negative electrode layer, and
a second exterior casing material disposed on the second surface of the stack opposing the first surface,
the first exterior casing material includes a cushioning layer,
the cushioning layer has a stress relaxation rate of 3% to 25%, the stress relaxation rate being represented by Equation 2,
Equation 2
Stress relaxation rate = $[(S1-S2)/S1] \times 100$
SI indicates a first stress measured when a first point is reached by compression by 50% of an initial thickness and then a second point is reached from the first point by additional compression by 13.33% of the initial thickness, and S2 indicates a second stress measured after 60 seconds lapse from a time of measuring the first stress.

2. The all solid secondary battery as claimed in claim 1, wherein the cushioning layer has a compression elastic modulus of 0.1 MPa to 100 MPa.

3. The all solid secondary battery as claimed in claim 1, wherein the cushioning layer has a deformation rate of 50% to 95% at a load of 10 MPa.

4. The all solid secondary battery as claimed in claim 1, wherein the cushioning layer has a 50% compression force deflection (CFD) according to ASTM D3574 of 0.25 MPa to 0.55 MPa.

5. An all solid secondary battery, comprising:

a stack including a positive electrode layer, a negative electrode layer, and a solid electrolyte layer disposed between the positive electrode layer and the negative electrode layer; and an exterior casing material accommodating and sealing the stack, wherein:

the positive electrode layer includes a positive electrode current collector and a positive electrode active material layer disposed on one surface or opposite surfaces of the positive electrode current collector, the negative electrode layer includes a negative electrode current collector and a first negative electrode active material layer disposed on the negative electrode current collector, the first negative electrode active material layer does not contain a solid electrolyte or an amount of the solid electrolyte contained in the first negative electrode active material layer is 3 wt % or less of the total weight of the first negative electrode active material layer;

the exterior casing material includes:

a first exterior casing material disposed on a first surface of the stack adjacent to the negative electrode layer, and a second exterior casing material disposed on the second surface of the stack opposing the first surface, the first exterior casing material includes a cushioning layer, the cushioning layer has a compression recovery ratio in a thickness direction of 65% to 99%, the compression recovery ratio in the thickness direction being represented by Equation 3, Equation 3

Compression recovery ratio $=AA2/AA1\times100C$

AA1 is a third stress measured at a first point which is reached by compression by 50% of an initial thickness, and AA2 is a fourth stress measured when a second point is reached by additional compression by 13.33% of the initial thickness from the first point, and then, after 60 seconds lapse at the second point, the first point is reached back by a relaxation from the second point.

6. The all solid secondary battery as claimed in claim 1, wherein a thickness of the first exterior casing material is 1 μm to 5000 μm, and a thickness of the cushioning layer is 1 μm to 1000 82 m.

7. The all solid secondary battery as claimed in claim 1, wherein:

the first exterior casing material further includes at least one selected from a metal layer and a polymer layer, the polymer layer includes a polymer, and the polymer has a gas permeability of 10 cc·20·μm/m²·24 h·atm or less.

8. The all solid secondary battery as claimed in claim 1, wherein the second exterior casing material includes at least one selected from a cushioning layer, a metal layer, and a polymer layer.

9. The all solid secondary battery as claimed in claim 1, wherein:

the exterior casing material includes a sealing portion disposed along outer edges of the first exterior casing material and the second exterior casing material, and the sealing portion further includes either an adhesive layer disposed between the first exterior casing material and the second exterior casing material, or a fusion portion in which the first exterior casing material and the second exterior casing material are fused to each other.

10. The all solid secondary battery as claimed in claim 1, further comprising an inactive member surrounding a side surface of the positive electrode layer.

11. The all solid secondary battery as claimed in claim 10, wherein:

the positive electrode layer includes a first positive electrode active material layer and a second positive electrode active material layer respectively disposed on opposite surfaces of the positive electrode current collector, the solid electrolyte layer includes a first solid electrolyte layer and a second solid electrolyte layer which are in contact with the first positive electrode active material layer and the second positive electrode active material layer, respectively, the negative electrode layer includes a first negative electrode layer and a second negative electrode layer which are in contact with the first solid electrolyte layer and the second solid electrolyte layer, respectively, and the inactive member surrounds a side surface of the positive electrode layer, is between the first solid electrolyte layer and the second solid electrolyte layer facing each other, and is separated from the first negative electrode layer and the second negative electrode layer.

12. The all solid secondary battery as claimed in claim 10, wherein:

the inactive member is a flame retardant inactive member, and the flame retardant inactive member includes a matrix and a filler, the matrix includes a base material and a reinforcing material, the base material includes a first fibrous material, the first fibrous material is an insulating material, and the first fibrous material includes at least one selected from pulp fibers, insulating polymer fibers, and ion conductive polymer fibers, the reinforcing material includes a second fibrous material, the second fibrous material is a flame retardant material, and the second fibrous material includes at least one selected from glass fibers and ceramic fibers, the filler is a moisture getter, and the filler contains a metal hydroxide, and the metal hydroxide is at least one selected from Mg (OH)₂, Fe(OH)₃, Sb(OH)₃, Sn(OH)₄, Tl(OH)₃, Zr (OH)₄, and Al(OH)₃.

13. The all solid secondary battery as claimed in claim 1, wherein:

the solid electrolyte includes a sulfide-based solid electrolyte, the sulfide-based solid electrolyte is one or more selected from $Li_2S$—$P_2S_5$, $Li_2S$—$P_2S_5$—$LiX$ where X is a halogen element, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ where m and n are each a positive number, and Z is one of Ge, Zn, or Ga, $Li_2S$—$GeS_2$, $Li_2S$—$SiS_2$—$Li_3PO_4$, $Li_2S$—$SiS_2$-$Li_pMO_q$, p and q are each a positive number, M is one of P, Si, Ge, B, Al, Ga, In, $Li_{7-x}PS_{6-x}Cl_x$ where $0 \leq x \leq 2$, $Li_{7-x}PS_{6-x}Br_x$ where $0 \leq x \leq 2$, and $Li_{7-x}PS_{6-x}Ix$ where $0 \leq x \leq 2$, the sulfide-based solid electrolyte is an Argyrodite-type solid electrolyte including one or more selected from among $Li_6PS_5Cl$, $Li_6PS_5Br$, and $Li_6PS_5I$, and a density of the Argyrodite-type solid electrolyte is 1.5 g/cc to 2.0 g/cc.

14. The all solid secondary battery as claimed in claim 1, wherein:

the first negative electrode active material layer includes a first negative electrode active material and a binder, the first negative electrode active material has a particle shape, and an average particle diameter of the first negative electrode active material is 4 μm or less, the first negative electrode active material includes at least one selected from a carbon-based negative electrode active material and a metal or metalloid negative electrode active material, the carbon-based negative electrode active material includes amorphous carbon, the metal or metalloid negative electrode active material includes at least one selected from the group consisting of gold (Au), platinum (Pt), palladium (Pd), silicon (Si), silver (Ag), aluminum (Al), bismuth (Bi), tin (Sn), and zinc (Zn), the first negative electrode active material includes a mixture of first particles consisting of amorphous carbon and second particles consisting of metal or metalloid, and an amount of the second particles is 8 wt % to 60 wt % based on a total weight of the mixture.

15. The all solid secondary battery as claimed in claim 1, further comprising a second negative electrode active material layer between the negative electrode current collector and the first negative electrode active material layer or between the solid electrolyte layer and the first negative electrode active material layer, wherein the second negative electrode active material layer is a metal layer including lithium or a lithium alloy.

16. An all solid secondary battery structure, comprising:

an all solid secondary battery stack including a plurality of all solid secondary batteries stacked in one direction, each of the all solid secondary batteries being the all solid secondary battery of claim 1, and an end plate disposed on one surface or opposite surfaces of the stack.

17. A method of manufacturing an all solid secondary battery, the method comprising:

providing an assembly; and preparing a sealed assembly by pressing and sealing the assembly, wherein:

the assembly includes:

a stack including a positive electrode layer, a negative electrode layer, and a solid electrolyte layer disposed between the positive electrode layer and the negative electrode layer; and an exterior casing material for accommodating and sealing the stack, the exterior casing material includes:

a first exterior casing material disposed on a first surface of the stack adjacent to the negative electrode layer, and a second exterior casing material disposed on the second surface of the stack opposing the first surface, the positive electrode layer includes a positive electrode current collector and a positive electrode active material layer disposed on one surface or opposite surfaces of the positive electrode current collector, the negative electrode layer includes a negative electrode current collector and a first negative electrode active material layer disposed on the negative electrode current collector, the first negative electrode active material layer does not contain a solid electrolyte or an amount of the solid electrolyte contained in the first negative electrode active material layer is 3 wt % or less of the total weight of the first negative electrode active material layer, the first exterior casing material includes a cushioning layer the cushioning layer has a stress relaxation rate of 3% to 25%, the stress relaxation rate being represented by Equation 2, Equation 2

Stress relaxation rate = $[(S1-S2)/S1] \times 100$

SI indicates a first stress measured when a first point is reached by compression by 50% of an initial thickness and then a second point is reached from the first point by additional compression by 13.33% of the initial thickness, and S2 indicates a second stress measured after 60 seconds lapse from a time of measuring the first stress.

18. The method as claimed in claim 17, wherein a pressure during the pressing is 100 MPa or more.

19. The method as claimed in claim 17, further comprising stacking the sealed assembly, wherein the stacking of the sealed assembly is performed in atmospheric pressure and in air atmosphere.

\* \* \* \* \*